(12) United States Patent
Chang et al.

(10) Patent No.: US 10,684,592 B2
(45) Date of Patent: Jun. 16, 2020

(54) WATCH TYPE TERMINAL

(71) Applicant: LG ELECTRONICS INC., Seoul (KR)

(72) Inventors: Minkyoung Chang, Seoul (KR); Younghun Joo, Seoul (KR); Won Ha, Seoul (KR); Dongcheon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 16/002,618

(22) Filed: Jun. 7, 2018

(65) Prior Publication Data
US 2019/0163144 A1    May 30, 2019

Related U.S. Application Data

(60) Provisional application No. 62/591,155, filed on Nov. 27, 2017.

(30) Foreign Application Priority Data

Dec. 29, 2017  (KR) .................. 10-2017-0184680

(51) Int. Cl.
*G04G 21/08*       (2010.01)
*G04G 9/00*        (2006.01)
(Continued)

(52) U.S. Cl.
CPC ............. *G04G 21/08* (2013.01); *G04B 19/04* (2013.01); *G04C 17/0091* (2013.01);
(Continued)

(58) Field of Classification Search
CPC ........ G04G 21/08; G04G 21/04; G04G 9/007; G04G 9/00; G04G 9/0064; G04G 9/0082; G04B 19/04; G04C 17/0091
See application file for complete search history.

(56) References Cited

U.S. PATENT DOCUMENTS 4,488,818 A  *  12/1984  Saurer ................. G04G 9/0094
                                          368/242
5,889,736 A       3/1999  Fujita et al.
(Continued)

FOREIGN PATENT DOCUMENTS

EP           2 851 756 A2      3/2015
WO    WO 2007/134643 A1      11/2007
(Continued)

*Primary Examiner* — Sean Kayes
(74) *Attorney, Agent, or Firm* — Birch, Stewart, Kolasch & Birch, LLP

(57) ABSTRACT

A watch type terminal including a main body; an analog watch portion including a plurality of mechanical hands coupled to the main body to indicate the time; a touch screen including a hole region disposed adjacent to the analog watch portion and through which a central shaft supporting the rotation of the plurality of mechanical hands is passed; a user input unit disposed on a side surface of the main body and including a plurality of keys; and a controller configured to display a first screen on the touch screen in which a part of the first screen is obstructed by the hole region, and in response to a predetermined input applied to one of the plurality of keys, move the obstructed part of the first screen away from the hole region and display a region beyond an edge of the first screen.

19 Claims, 21 Drawing Sheets

(51) Int. Cl.
*G04C 17/00* (2006.01)
*G04B 19/04* (2006.01)
*G04G 21/04* (2013.01)
*G06F 3/041* (2006.01)

(52) U.S. Cl.
CPC ........... *G04G 9/007* (2013.01); *G04G 9/0064* (2013.01); *G04G 9/0082* (2013.01); *G04G 21/04* (2013.01); *G06F 3/041* (2013.01)

(56) References Cited

U.S. PATENT DOCUMENTS

| | | | |
|---|---|---|---|
| 9,880,524 B2* | 1/2018 | Ryu | G04G 9/0064 |
| 10,146,188 B2* | 12/2018 | Katzer | G04B 19/04 |
| 2016/0306328 A1 | 10/2016 | Ko et al. | |
| 2017/0003710 A1 | 1/2017 | MacWilliams et al. | |
| 2017/0068217 A1 | 3/2017 | Chen et al. | |
| 2017/0075316 A1 | 3/2017 | Berdinis et al. | |

FOREIGN PATENT DOCUMENTS

| | | |
|---|---|---|
| WO | WO 2016/039587 A1 | 3/2016 |
| WO | WO 2016/141393 A1 | 9/2016 |

* cited by examiner

[Right]

[Left]

WATCH TYPE TERMINAL

CROSS-REFERENCE TO RELATED APPLICATION

Pursuant to 35 U.S.C. § 119 (a), this application claims the benefit of an earlier filing date and priority to Korean Application No. 10-2017-0184680 filed on Dec. 29, 2017, and U.S. Provisional Application No. 62/591,155 filed Nov. 27, 2017, the contents of which are incorporated by reference herein in their entirety.

BACKGROUND OF THE DISCLOSURE

1. Field of the Disclosure

The present disclosure relates to a watch type terminal to which a mechanical analog watch is applied.

2. Background of the Disclosure

Terminals may be generally classified as mobile/portable terminals or stationary terminals. Mobile terminals may also be classified as handheld terminals or vehicle mounted terminals.

A mobile terminal may extend to a wearable device which is wearable on a human body, going beyond usually using the mobile terminal by a user with grabbing it with a hand. One example of such a wearable device is a watch type terminal that can be worn on the user's wrist.

The functions of such watch type terminals are diversified, and evolve into various types of designs. In particular, watch type terminals are similar to analog wristwatches in that they are worn on the user's wrist. Therefore, a watch type terminal to which a mechanical analog watch is applied has been considered in addition to an analog clock screen in order to further emphasize the true value of the watch while satisfying the sensibility of the actual analog wrist watch to the watch type terminal.

Further, in a mechanical analog watch, protruding mechanical hands are positioned on the front surface, and a movement for rotating the mechanical hands is coupled to an inner portion or rear surface thereof with respect to the central or rotational shaft. As a result, a hole region is generated at the center of the screen on which digital information is displayed. However, since the screen is small due to the nature of the watch type terminal, the user is inconvenienced in checking digital information even if the size of the hole region is reduced to the maximum.

SUMMARY OF THE DISCLOSURE

Accordingly, an object of the present disclosure is to provide a watch type terminal for securing visibility to the maximum and allowing a user to easily and quickly check information covered by a hole region at the center of the screen even when a hall region is physically present at the center of the screen due to the application of a mechanical analog watch.

Another object of the present disclosure is to provide various UIs/UXs for controlling a screen using a hole region at the center of the screen.

For this purpose, a watch type terminal according to an embodiment of the present disclosure may include a main body; an analog watch portion including a plurality of mechanical hands coupled to the main body to indicate the time; a touch screen including a hole region disposed adjacent to the analog watch portion and through which a central shaft supporting the rotation of the plurality of mechanical hands is passed; a user input unit disposed on a side surface of the main body and including a plurality of keys; and a controller configured to control the touch screen to display first screen information on the touch screen, and move the first screen information in a predetermined direction such that at least a part of the first screen information is displayed away from the hole region and display a region beyond an edge of the first screen information according to the movement when a predetermined input is applied to one of the plurality of keys.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE PREFERRED EMBODIMENTS

Figure 1A:
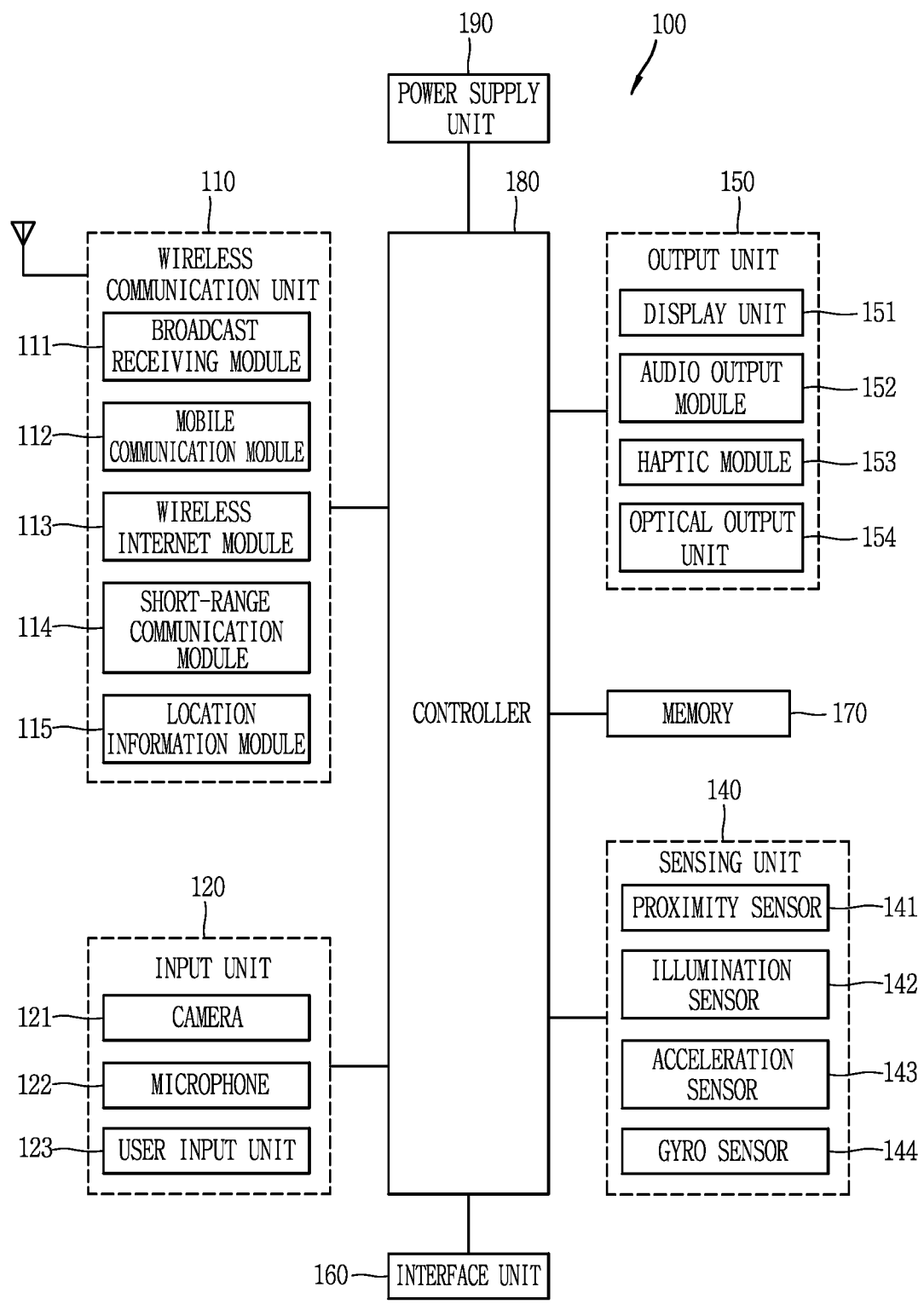
FIG. 1A is a block diagram of a watch type terminal according to an embodiment of the present disclosure.

Hereinafter, a mobile terminal associated with the present disclosure will be described in detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning. A suffix "module" and "unit" used for constituent elements disclosed in the following description is merely intended for easy description of the specification, and the suffix itself does not give any special meaning or function.

FIG. 1A is a block diagram illustrating a watch type terminal 100 associated with an embodiment of the present disclosure. The watch type terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, the constituent elements as illustrated in FIG. 1A are not necessarily required, and the watch type terminal 100 may be implemented with greater or less number of elements than those illustrated elements.

Hereinafter, the constituent elements will be described in sequence. The wireless communication unit 110 may include one or more modules allowing radio communication between the watch type terminal 100 and a wireless communication system, or allowing radio communication between the watch type terminal 100 and a network in which the watch type terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may also be provided through a mobile communication network. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160. The mobile communication module 112 transmits and receives wireless signals to and from at least one a base station, an external terminal and a server on a mobile communication network. Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the watch type terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth, Radio Frequency IDentification (RFID), Infrared Data Association (IrDA), Ultra WideBand (UWB), ZigBee, and the like. The location information module 115 is a module for acquiring a location of the watch type terminal 100, and there is a GPS module as a representative example.

Referring to FIG. 1A, the A/V (audio/video) input unit 120 receives an audio or video signal, and the A/V (audio/video) input unit 120 may include a camera 121 and a microphone 122. The camera 121 processes an image frame, such as still picture or video, acquired by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile device.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may include assorted noise removing algorithms to remove noise generated in the course of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the watch type terminal 100 such as a location of the watch type terminal 100, whether or not there is a user's contact, an orientation of the watch type terminal 100, an acceleration/deceleration of the watch type terminal 100, and the like, and generates a sensing signal for controlling the operation of the watch type terminal 100. Furthermore, the sensing unit 140 may sense whether or not the interface unit 170 is coupled to an external device or the like.

Further, the sensing unit 140 may further include a proximity sensor 141 and an illuminance sensor 142, an acceleration sensor 143, and a gyro sensor 144. The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the watch type terminal 100. For example, when the watch type terminal 100 is in a phone call mode, the display unit 151 may display a User Interface (UI) or a Graphic User Interface (GUI) associated with a call. When the watch type terminal 100 is in a video call mode or image capturing mode, the display unit 151 may display a captured image and/or received image, a UI or GUI.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, and a 3-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. A rear structure of the display unit 151 may also be configured with a light transmission type. Under this configuration, the user can view an object positioned at a rear side of the terminal body through a region occupied by the display unit 151 of the terminal body.

Two or more display units 151 may be implemented according to a configured aspect of the watch type terminal 100. For instance, a plurality of the display modules may be arranged on one surface to be spaced apart from or integrated with each other, or may be arranged on different surfaces on the watch type terminal 100.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, a signal (signals) corresponding thereto may be transmitted to a touch controller. The touch controller may process the received signals, and then transmit corresponding data to the controller 180. Accordingly, the controller 180 can sense which region of the display unit 151 has been touched.

Referring to FIG. 1A, a proximity sensor 141 may be arranged at an inner region of the watch type terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the watch type terminal 100 (e.g., sound alarming a call received or a message received, and so on). The audio output module 152 may include a receiver, a speaker, a buzzer, and so on.

The alarm 153 outputs signals notifying occurrence of events from the watch type terminal 100. The events occurring from the watch type terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

A haptic module 154 may generate various tactile effects the user may feel. A representative example of the tactile effects generated by the haptic module 154 includes vibration. Vibration generated by the haptic module 154 may have a controllable intensity, a controllable pattern, and so on. For example, different vibrations may be output in a synthesized manner or in a sequential manner.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be configured to transmit tactile effects through a user's direct contact, or a user's muscular sense using a finger or a hand. Two or more haptic modules 154 may be provided according to the particular configuration of the watch type terminal 100.

The memory 160 can store programs to support operations of the controller 180 and store input/output data (for example, phonebook, messages, still images, videos, etc.). The memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the watch type terminal 100 may be operated in relation to a web storage device that performs the storage function of the memory 160 over the Internet.

The interface unit 170 may generally be implemented to interface the watch type terminal with external devices. For example, the interface unit 170 can receive data transmitted from an external device, receive power to transfer to elements and components within the watch type terminal 100, or transmit internal data of the watch type terminal 100 to such external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the watch type terminal 100, which may include a User Identity Module (UIM), a Subscriber Identity Module (SIM), and the like. In addition, the device having the identification module (also referred to herein as an "identification device") may take the form of a smart card. Hence, the identification device can be coupled to the mobile terminal 100 via a port.

The interface unit may serve as a path for power to be supplied from an external cradle to the watch type terminal 100 when the watch type terminal 100 is connected to the external cradle, or as a path for transferring various command signals input from the cradle by the user to the watch type terminal 100. Such various command signals or power input from the cradle may be operated as signals for recognizing that the watch type terminal has accurately been mounted on the cradle.

The controller 180 typically controls the overall operations of the watch type terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

The controller 180 can perform a pattern recognition processing so as to recognize handwriting or drawing input performed on the touch screen as a text or image.

The power supply unit 190 may receive external or internal power to provide power required by various components under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Figure 1B:
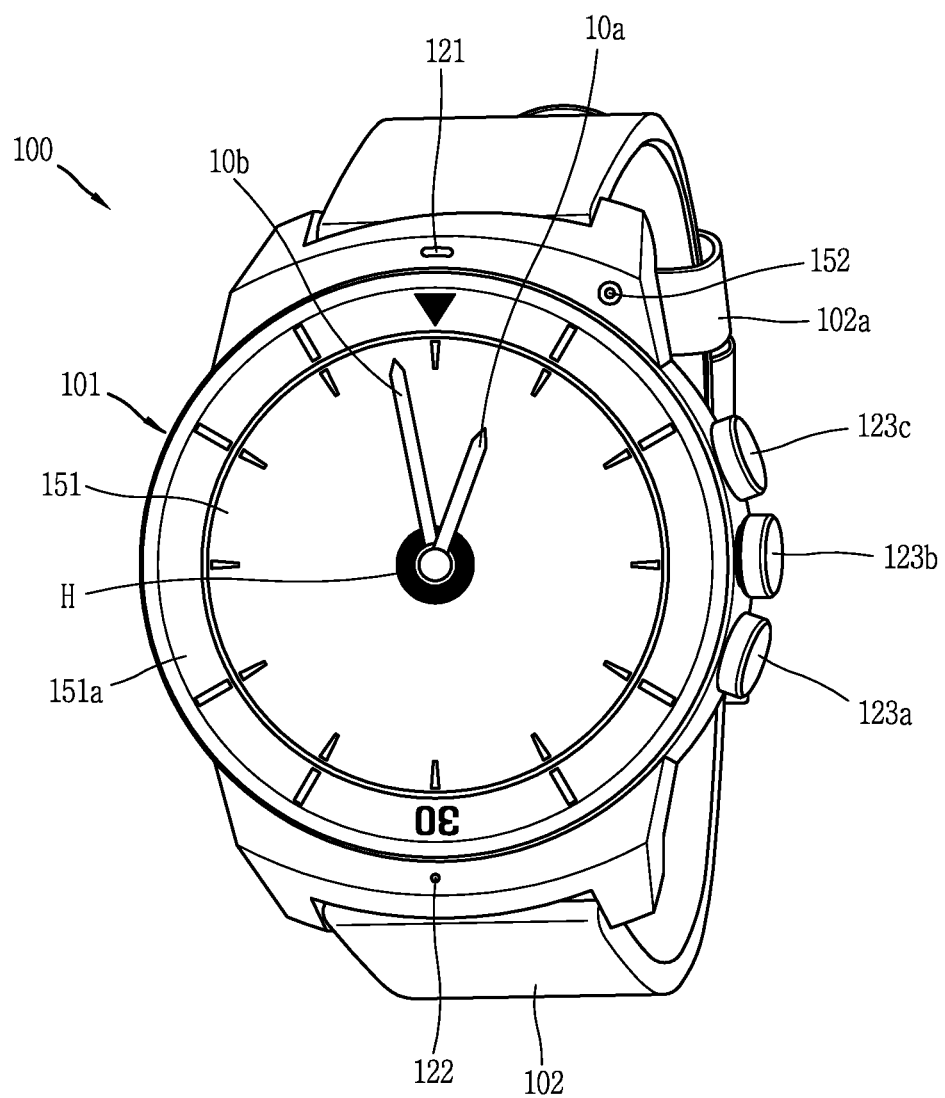
FIG. 1B is a view illustrating an example of a watch type terminal according to an embodiment of the present disclosure.

FIG. 1B is a view illustrating an example of the watch type terminal 100 associated with an embodiment of the present disclosure. Referring to FIG. 1B, the watch type mobile terminal 100 may include a main body 101 provided with a display unit 151, and a band 102 connected to the main body 101 to be wearable on a wrist.

The main body 101 may include a case having a certain appearance. The case and the band 102 may be made of metal, but are not limited thereto. In addition, the case may include a first case 101 that provides an internal space for accommodating various electronic components. However, the present disclosure is not limited thereto, and a single case may be configured to provide the inner space to implement a watch type terminal 100 having a uni-body shape.

The watch type mobile terminal 100 can perform wireless communication, and an antenna for the wireless communication can be installed in the main body 101. The antenna can extend its function using the case. For example, a case including a conductive material can be electrically connected to the antenna to extend a ground area or a radiation area.

When a SIM (Subscriber Identification Module) is built in the watch type terminal 100 itself, it is possible to independently transmit and receive calls, messages, and the like in the watch type terminal 100 without being paired with another device.

The display unit 151 is shown located at the front side of the main body 101 so that displayed information is viewable to a user. In some embodiments, the display unit 151 includes a touch sensor so that the display unit can function as a touch screen. As illustrated in the drawing, a window 151*a* in the form of a glass cover, for example, is disposed at an upper portion of the display unit 151 to form a body.

Furthermore, in the present disclosure, a hole H serving as a fixed center of mechanical hands, that is, actual mechanical hands, is disposed at the center of the display unit 151. Therefore, when information is displayed on the display unit 151, no information is displayed in the hole region. In addition, a display unit 151 layered with a touch sensor is disposed at an upper portion of the mechanical hands to allow a user's touch input despite the movement of the mechanical hands. Meanwhile, when the window 151a is provided at an upper portion of the display unit 151, the user may control the screen displayed on the display unit 151 through the window 151a.

The main body 101 may include an audio output unit 152, a camera 121 and a microphone 122, and a user input unit including a plurality of keys 123a, 123b, 123c may be provided on a side surface of the main body. When the display unit 151 is implemented as a touch screen, it may function as a user input unit 123. Among them, at least one key 123b may be pulled out, and rotated in a clockwise or counterclockwise direction while being pulled out to generate a different control command.

The band 102 can be worn on the wrist in a surrounding manner. The band 302 may be made of a flexible material for facilitating the wearing. The band 202 is commonly worn on the user's wrist and may be made of a flexible material for facilitating wearing of the device. The band 202 may also be configured to be detachable from the main body 201. Accordingly, the band 302 may be replaceable with various types of bands according to a user's preference. In another example, the band 102 may be made of a metal material for a sense of quality.

Further, the band 102 may be used for extending the performance of the antenna. For example, the band may include therein a ground extending portion electrically connected to the antenna to extend a ground area.

The band 102 may be provided with a fastener 102a. The fastener 202a may be implemented into a buckle type, a snap-fit hook structure, a Velcro type, or the like, and include a flexible section or material. The drawing illustrates an example that the fastener 202a is implemented into the buckle type. Furthermore, a sensor capable of sensing a user's bio-signal, for example, a pulse, when worn on the user's wrist, may be provided on a rear surface of the main body 101.

Figure 2A:
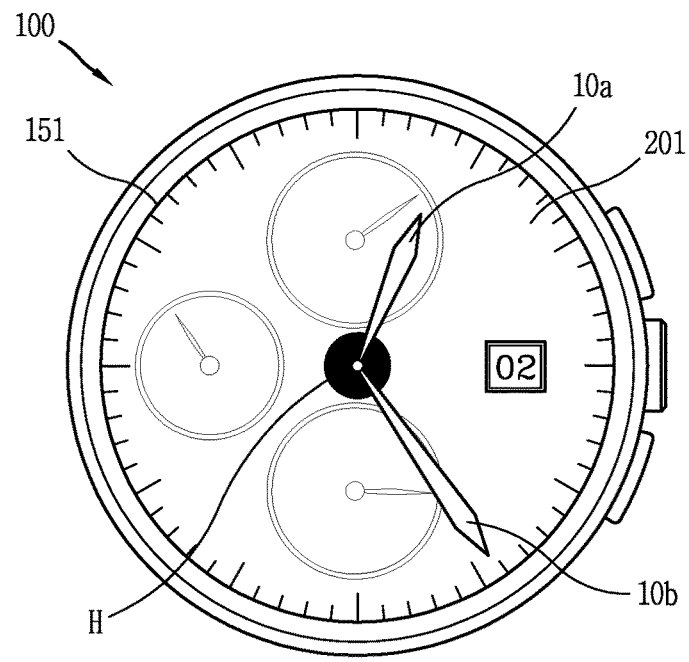
FIGS. 2A, 2B, and 2C illustrate examples in which information is displayed on a display during the operation of an analog watch in a watch type terminal according to an embodiment of the present disclosure.

In addition, referring to FIG. 2A, a watch type terminal 100 according to the present disclosure includes an analog watch portion including a plurality of mechanical hands 10a, 10b indicating time, and for example, a display 151 arranged to be layered on the upper/lower sides and formed to enable a touch input is provided adjacent to the analog watch portion. Moreover, a plurality of protruded keys are provided on a side surface of the main body, for example, the right side surface, and they may be of course deformed into a recessed shape or a shape that is integrated with (i.e., not protruded or recessed from) the frame.

As illustrated in the drawing, a hole (H) for fixing one end of mechanical hands is present at the center of the display unit 151. For example, a display on which a graphic image is displayed is disposed on a rear case of the main body, mechanical hands 10a, 10b are attached around the hole (H), and a window-shaped window cover on which a touch panel is layered and on which a touch input is sensed can be arranged in order.

However, the structure of the present disclosure is not limited to such an arrangement, and various structures and shapes are allowed in a range capable of allowing a user's touch input regardless of the positions of the mechanical hands while a display on which a graphic image is displayed and mechanical hands are shown at the same time.

Furthermore, in the present disclosure, the hole (H) refers to a portion through which a central shaft (or a rotational shaft or movement shaft) supporting the rotation of the mechanical hands 10a, 10b passes. Accordingly, one end of the mechanical hands of the analog watch portion is rotated in conjunction with the movement shaft at the hole position. There is a limitation that information cannot be displayed on a hole included in the display unit 151 due to a mechanical coupling of the analog clock portion. In addition, a plurality of chronographs 201 may be displayed on the display unit 151 in order to further give the analog watch a sense of quality.

Figure 2B:
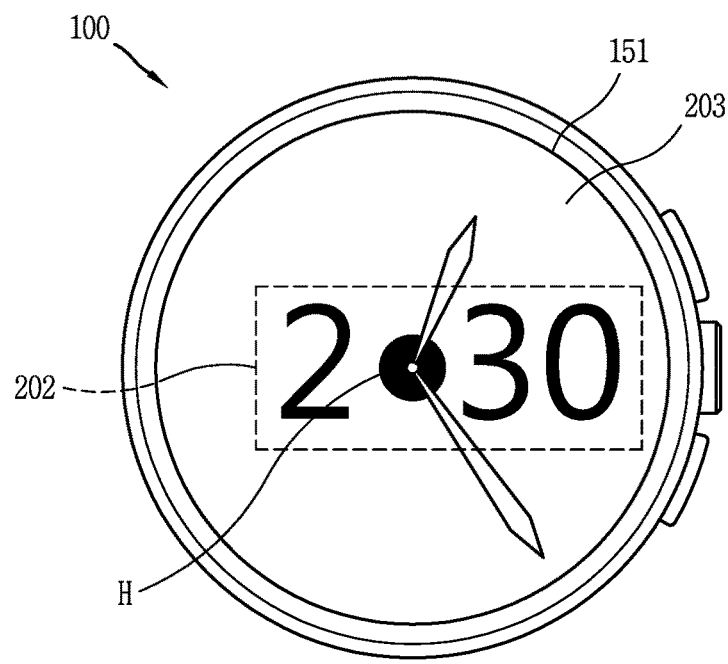

Subsequently, different examples in which the application of a clock function by the mechanical hands 10a, 10b and a display function of a digital graphic image coexist will be described in detail with reference to FIGS. 2B and 2C. First, FIG. 2B shows an example in which the time display by the mechanical hands 10a, 10b is displayed simultaneously with the digital time display 202 displayed on the display unit 151. Further, the controller 180 (or the processor) can recognize a fixed hole (H) region at the center and control the display unit 151 to display the digital time display 202 out of the hole region. For example, as illustrated in FIG. 2B, it can be seen that 'hour' information (e.g., 2 o'clock) is displayed on the left side, and 'minute' information (e.g., 30 minutes) on the right side with respect to the hole region (H) in the digital time display 202. Further, the 'hour' information and the 'minute' information of the digital time display 202 may be changed according to a position of the mechanical hands 10a, 10b (e.g., a position indicating a time arranged in a horizontal direction).

Figure 2C:
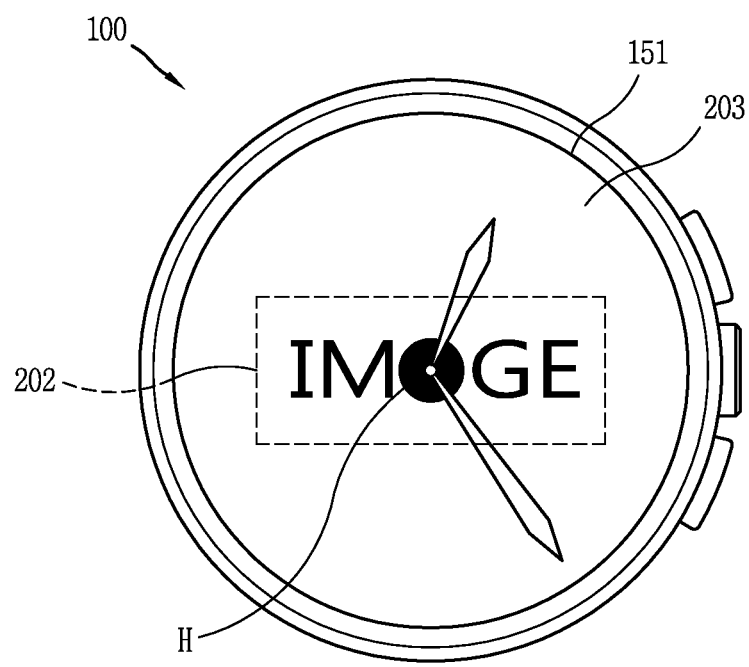

In another example, FIG. 2C illustrates an example in which part of a graphic image 202 displayed on the display unit 151 is partially covered or overlapped due to the hole region (H) located at the center of the display unit 151. However, a touch input applied to the fixed hole region (H) may of course be recognized. In addition, the controller 180 can recognize an object region 202 partially or entirely covered and an object region 203 entirely exposed due to the hole (H) region in a distinguished manner among graphic images displayed on the display unit 151, and thus it is possible to implement individual control over each of the object regions 202, 203.

The watch type terminal 100 according to the present disclosure having the structure as described above may further apply the true functions of the watch using mechanical hands together with various smart watch functions, thereby further maximizing the true value and analog sensibility of the watch. However, the hole region (H) existing due to the mechanical hands occasionally covers information displayed on the display unit 151, and according to the present disclosure, a variety of embodiments for providing user convenience while solving such a problem are implemented.

Figure 3:
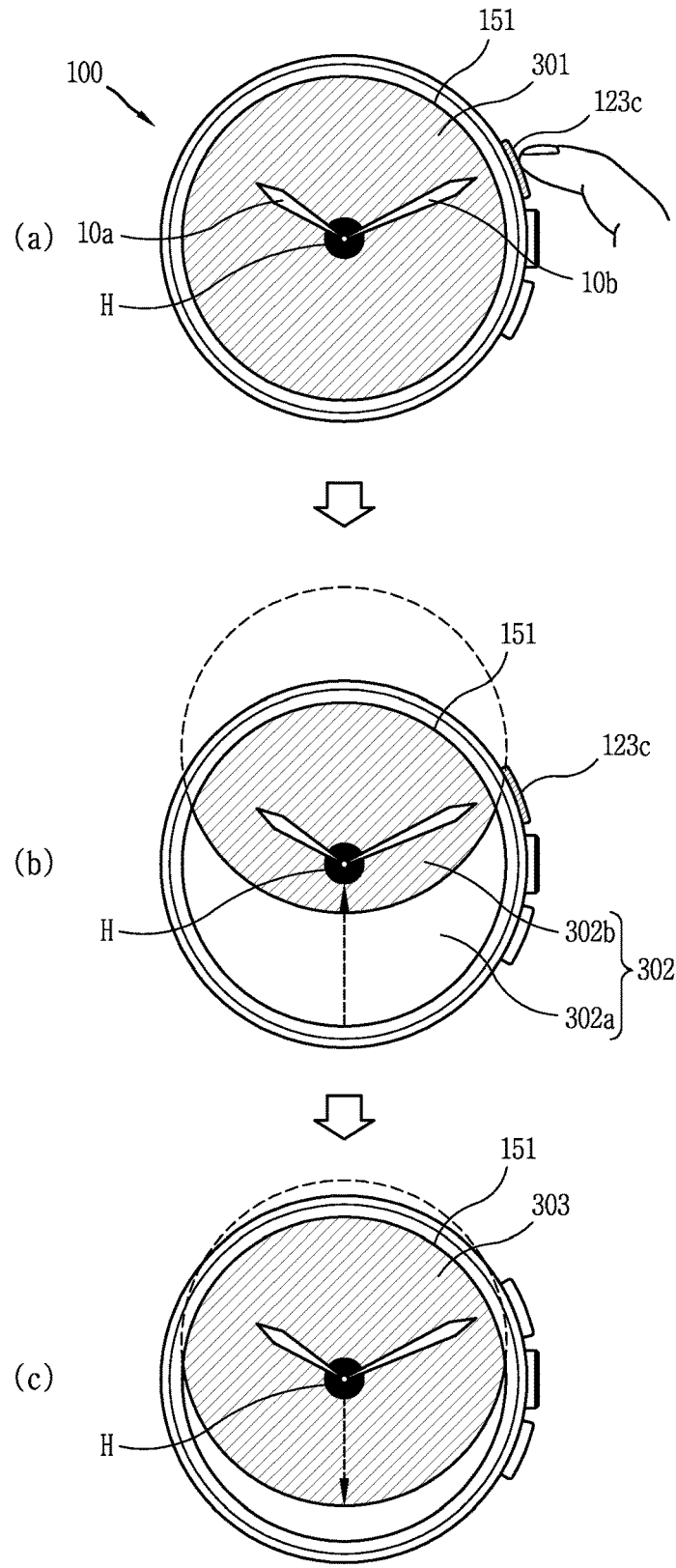
FIG. 3 is a representative view illustrating a method of quickly checking information covered by a hole region of mechanical hands using a user input in a watch type terminal according to an embodiment of the present disclosure.

First, a method of quickly checking information covered or obstructed by a hole region of mechanical hands using a user input unit provided on a side surface of the watch type terminal 100 will be described in detail with reference to FIG. 3. As illustrated in FIG. 3, the analog watch portion applied to the watch type terminal 100 operates with a clock function while the mechanical hands, namely, the mechanical hands 10a, 10b, rotate around the hole region (H) of the touch screen 151 as a central shaft. In other words, each end portion of the mechanical hands 10a, 10b is coupled to the hole region (H) of the touch screen 151, and the central shaft supporting the rotation of the clock hand 10a, 10b is passed therethrough.

In more detail, first screen information 301 can be displayed on the touch screen 151, and there is no limitation on the type of the first screen information. For example, the first screen information may be a black screen (or ambient mode screen), a clock screen, a home screen, a screen of a specific application, and may have various attributes such as document, text, video, multimedia, and the like.

When a predetermined input, for example, a single push input, is applied to one of keys provided on a side surface of the main body, for example, a key 123c disposed on the upper side, while the first screen information 301 is displayed as described above, the controller 180 generates a control command for shifting the first screen information 301 in a predetermined direction. FIG. 3 illustrates the first screen information 301 is moved upward with respect to the hole region (H), but the present disclosure is not limited thereto, and may be implemented as an example in which the first screen information 301 is moved downward/leftward/rightward. However, in the present disclosure, it is illustrated that the first screen information 301 is shifted upward in consideration of visual stability.

The information that has been displayed at a lower side of the hole region (H) in the first screen information 301 according to the movement of the first screen information 301, for example, a second portion, is moved upward and displayed (302b). Accordingly, information that has been covered by the hole region (H) or partially overlapped with the hole region (H) is entirely exposed away from the hole region (H). Further, information that has been displayed at an upper side of the hole region (H) in the first screen information 301, for example, a first portion, disappears from the touch screen 151 according to the movement of the screen.

Furthermore, when the first screen information 301 is not displayed as part of an image or a document, for example, a region 302a beyond an edge of the first screen information 301, namely, a third portion, is displayed at a lower side of the first screen information 301. Further, no information or predetermined specific information can be displayed on the third portion 302a.

In addition, a line corresponding to a border shape (e.g., circle) of the touch screen 151, namely, an arc line in which the center of the circle is moved upward can be displayed at a boundary between the second portion 302b and the third portion 302a, thereby intuitively viewing that the second portion 302b is a part of the moved first screen information. Accordingly, when the shape of the touch screen of the watch type terminal is a rectangle, a line corresponding thereto, namely, a straight line segment in which the center of the rectangle is moved upward, can be displayed.

Further, the screen information 302 corresponding to the movement of the first screen information 301 is restored to the original first screen information 302 again when a preset period of time has elapsed (C). In addition, a visual effect in which the moved screen information 302 gradually moves downward can be displayed. As a result, the third portion 302a, which is a region beyond the edge of the first screen information, disappears from the touch screen 151.

According to an embodiment, a degree of movement of the first screen information 301 can be determined differently based on at least one of a size of the hole region and a size of the object covered by the hole region. For example, as an amount and size of the object covered by the hole region (H) increases, a degree of movement of the first screen information 301 can increase.

Furthermore, according to an example, the degree of movement of the first screen information 301 can be previously set to a default value, and can also be changed through a user input. In addition, when a push input is applied to the key 123c on the side again before reaching a preset time after the movement of the first screen information 301, the first screen information is immediately restored to the original position.

Moreover, according to an embodiment, the controller 180 can recognize at least a part of the first screen information 301 covered by or overlapped with the hole region (H), and when a push input is applied to the key 123c, the touch screen 151 can be controlled such that only the recognized object is disposed in the other region away from the hole region (H).

As described above, according to the present disclosure, information covered by the hole region (H) existing due to the application of the mechanical analog watch portion can be checked quickly only by pushing the key provided on the side.

Figure 4A:
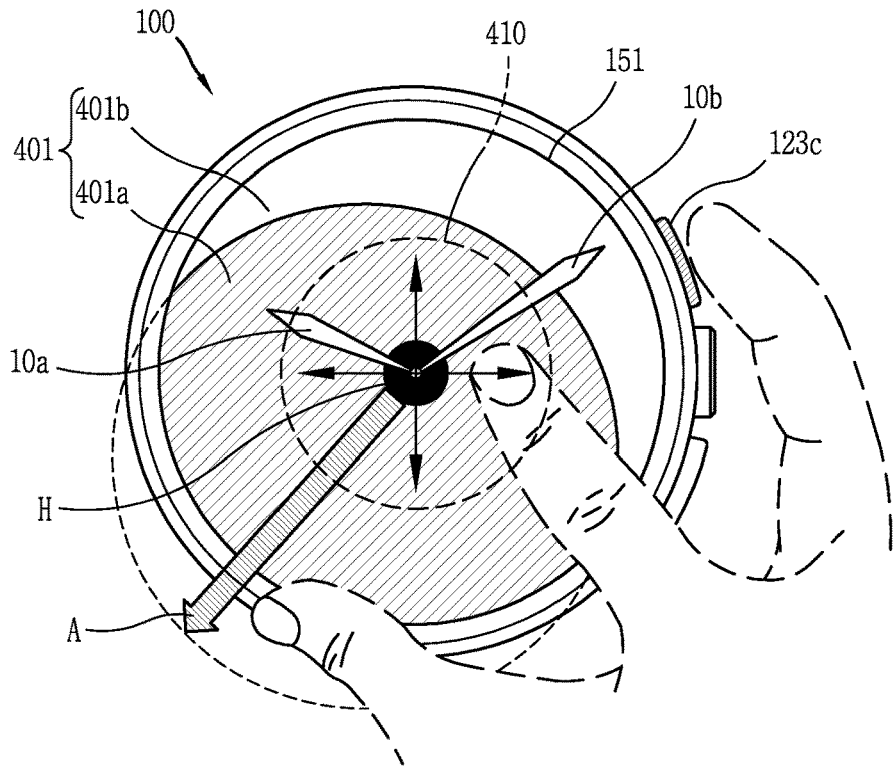
FIGS. 4A and 4B are examples of a method of controlling the movement of a screen using a key input and a touch input.
Figure 4B:
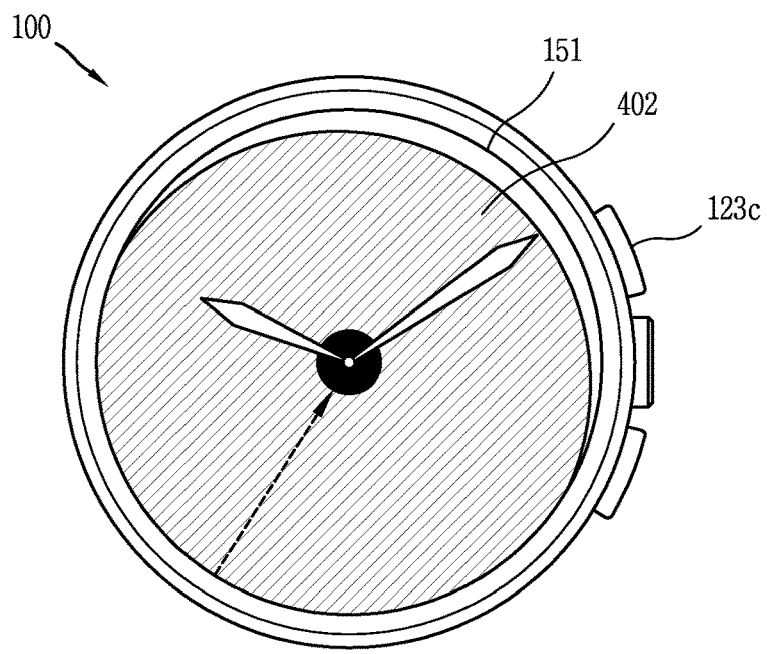

Hereinafter, various embodiments for shifting the displayed screen information to a desired position around the hole region (H) will be described with reference to FIGS. 4A, 4B, 5A through 5E, 6A, 6B and 6C. First, FIGS. 4A and 4B are examples of a method of finely adjusting the movement of a screen by combining a key input and a touch input, and FIGS. 5A through 5E are examples of a method of finely adjusting the movement of a screen by combining a key input and a body movement;

As illustrated in FIG. 4, when a push input is applied to the upper key 123c provided on a side surface of the watch type terminal 100, a drag and touch input can be applied to the touch screen 151 to more finely adjust the display position of the screen information 410. Specifically, when a touch is applied to the touch screen 151 and when a push input is applied to the upper key 123c provided on a side surface of the main body, an indicator (for example, four directional keys shape) indicating that the screen information 410 can be controlled in four directions can be displayed in an overlapping manner with the hole region (H). Then, when the touch input applied to the touch screen 151 is dragged in the direction of 'A' while maintaining the push input applied to the upper key 123c, the entire screen information is shifted in the direction of 'A' along the dragged path.

While the first portion 401a that has been displayed at an upper right side of the screen information moves in the direction of 'A', a region 401b beyond an edge of the first portion 401a is displayed together (401). Further, when the touch input is further dragged in the direction of 'A', the region 401b beyond the edge of the first portion 401a is further increased. In addition, the display state of the position-adjusted screen information is continuously fixed while the input applied to the side key 123c is maintained even when the touch input applied to the touch screen 151 is released. Besides, when the input applied to the side key 123c is released, the display state of the position-adjusted screen information is restored to its original state, while the region 401b beyond the edge of the first portion 401a disappears. As a result, the information that has been covered by the hole region (H) is located again in the hole region (H).

Figure 5A:
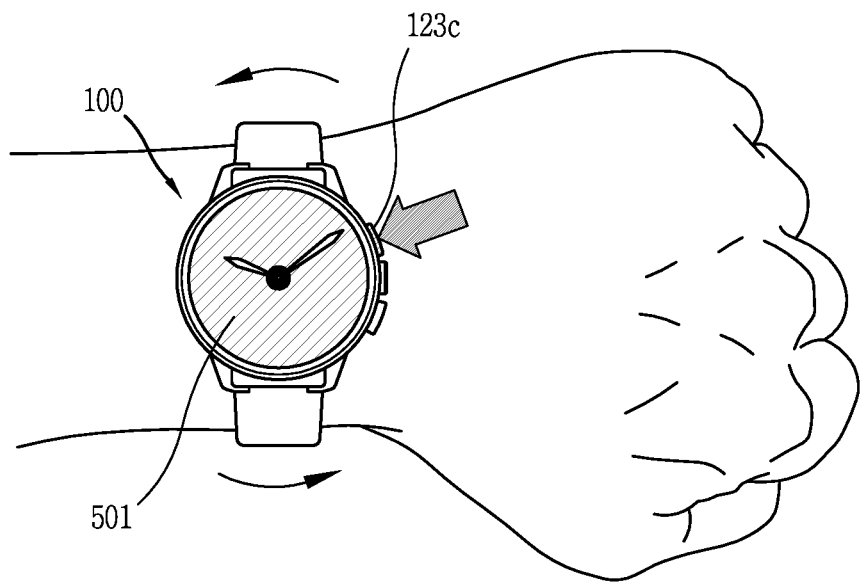
FIGS. 5A through 5E are examples of a method of controlling the movement of a screen using a key input and a body movement in a watch type terminal according to an embodiment of the present disclosure.

Next, referring to FIGS. 5A through 5E, when the main body of the watch type terminal 100 is worn and the side upper key 123c is pushed as illustrated in FIG. 5A, sensors, for example, an acceleration sensor and/or a gyro sensor, for sensing the movement of the main body provided in the watch type terminal 100 can be activated to sense the movement of the main body, thereby allowing the controller 180 to control the movement direction and movement degree of the screen information 501 displayed on the touch screen 151.

Figure 5B:
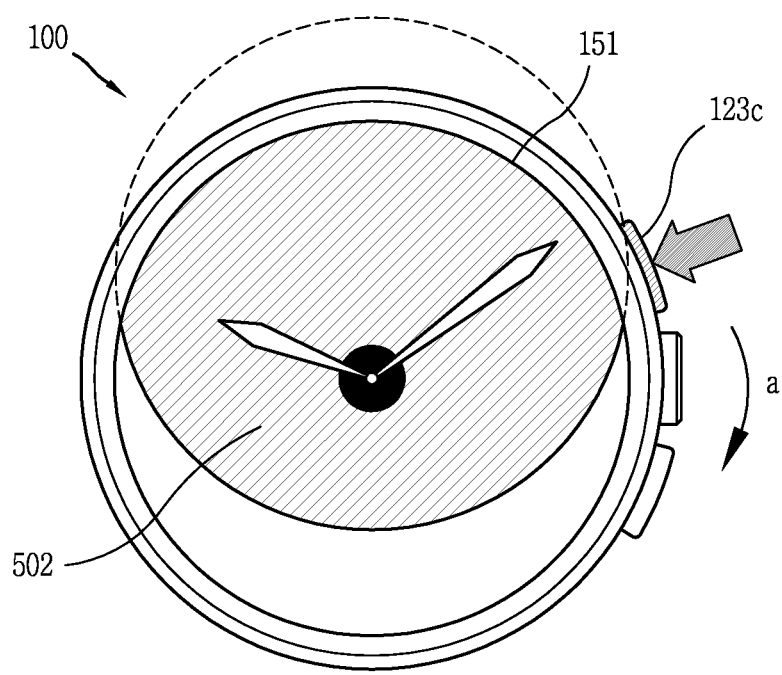
Figure 5C:
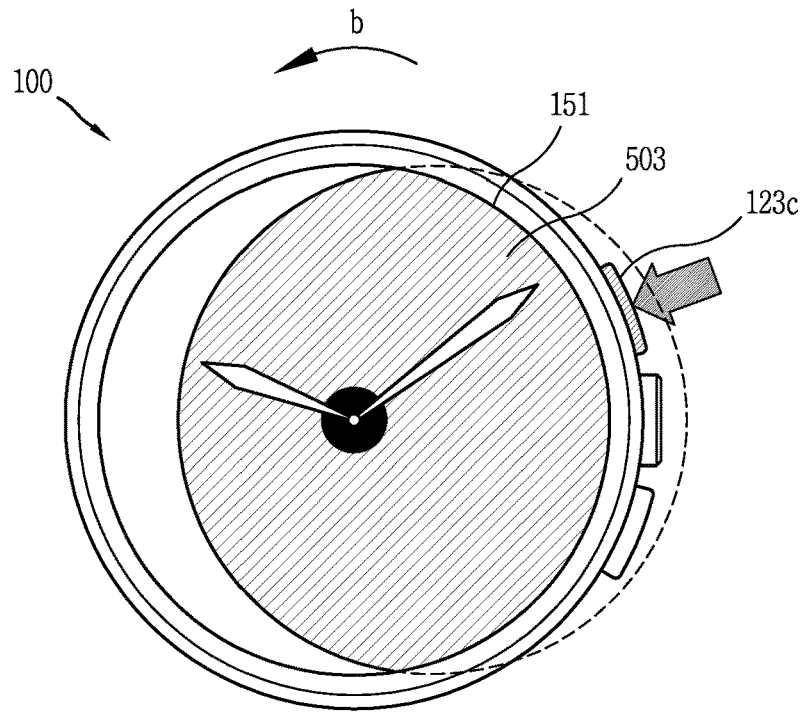

Specifically, when a wrist wearing the watch type terminal 100 is moved in the direction of 'a' as illustrated in FIG. 5B, the screen information 501 is moved upward and displayed (502), a region beyond the edge of the screen information is displayed at a lower side of the touch screen 151. In another example, when a wrist wearing the watch type terminal 100 is moved in the direction of 'b' as illustrated in FIG. 5C, the screen information 501 is moved rightward and displayed by sensing the movement direction and degree through the sensors (503), and a region beyond the edge of the screen information is displayed on the left side of the touch screen 151. Further, when the user further moves in the direction of 'b', the size of a region beyond the edge is further increased while the screen information moves further to the right.

Figure 5D:
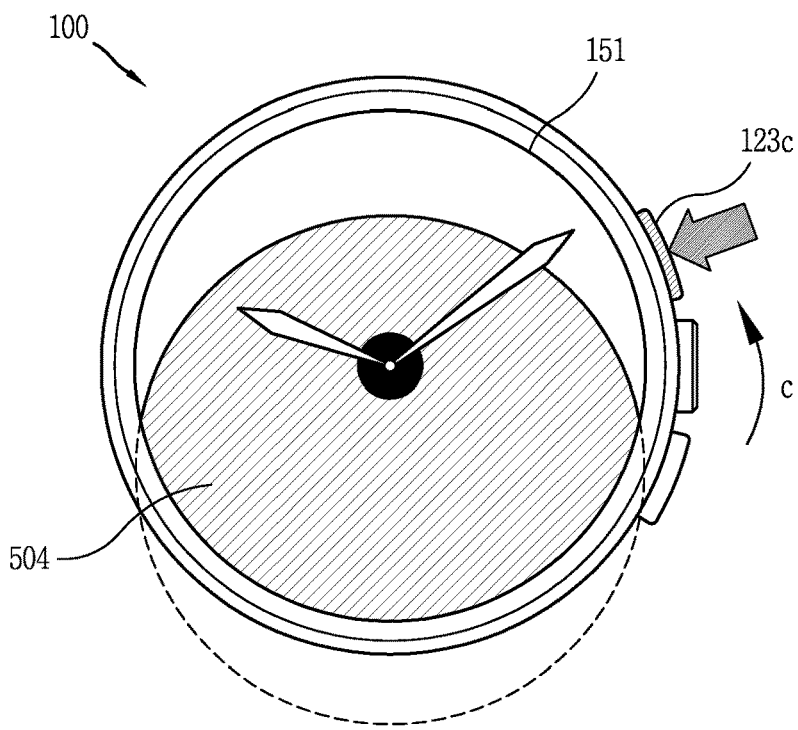
Figure 5E:
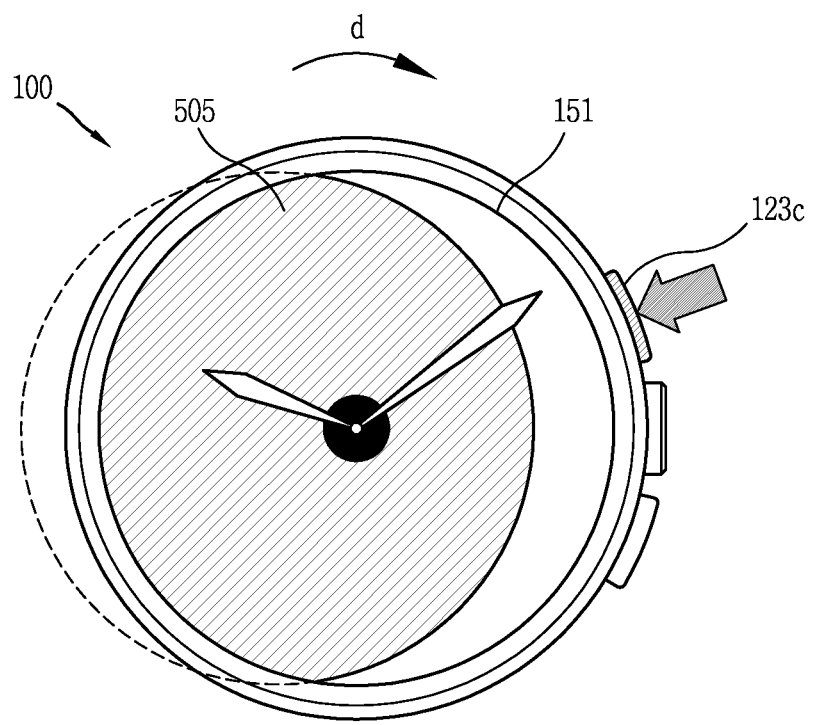

Moreover, as illustrated in FIG. 5D, when a wrist wearing the watch type terminal 100 is moved in the direction of 'c', the screen information 501 moves downward around the hole region (H). In addition, as illustrated in FIG. 5E, when a wrist wearing the watch type terminal 100 is moved in the direction of 'd', the screen information 501 moves leftward around the hole region (H).

Besides, the movement in the directions of 'a', 'b', 'c' and 'd' described above may of course be repeatedly performed in combination thereof. Accordingly, the user may quickly check the information that has been covered by the mechanical hands 10a, 10b as well as the hole region (H). Then, when the push input applied to the key 123c on the side is released, the moved screen information is restored to its original display position.

Figure 6A:
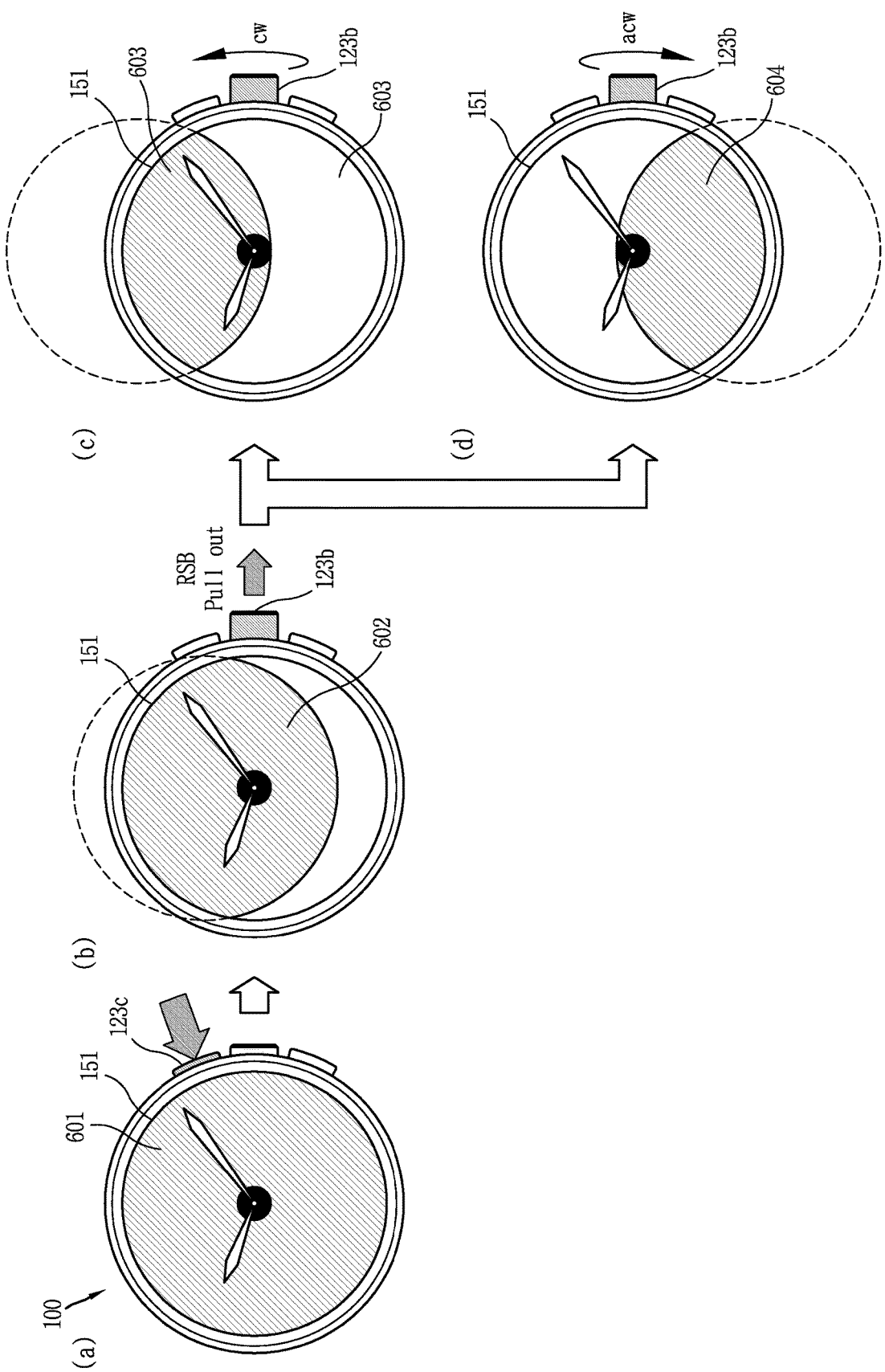
FIGS. 6A, 6B and 6C are exemplary views illustrating a method of setting a screen to be fixed to a desired moving position using a key input and quickly approaching the desired moving position in a watch type terminal according to an embodiment of the present disclosure.
Figure 6B:
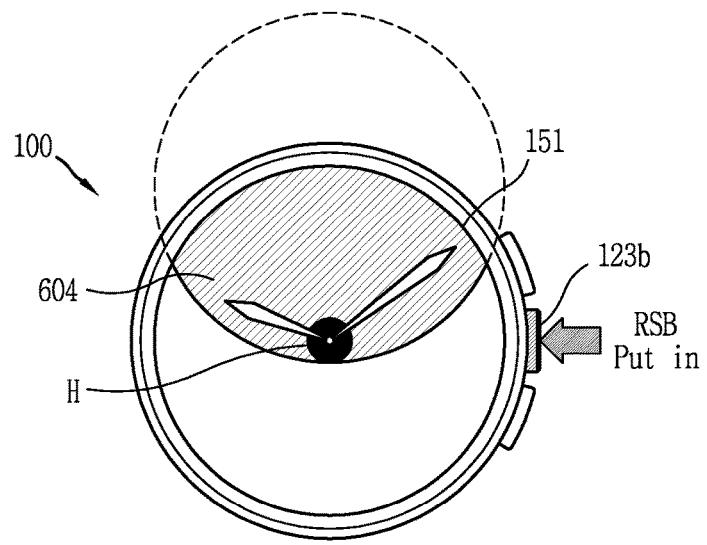
Figure 6C:
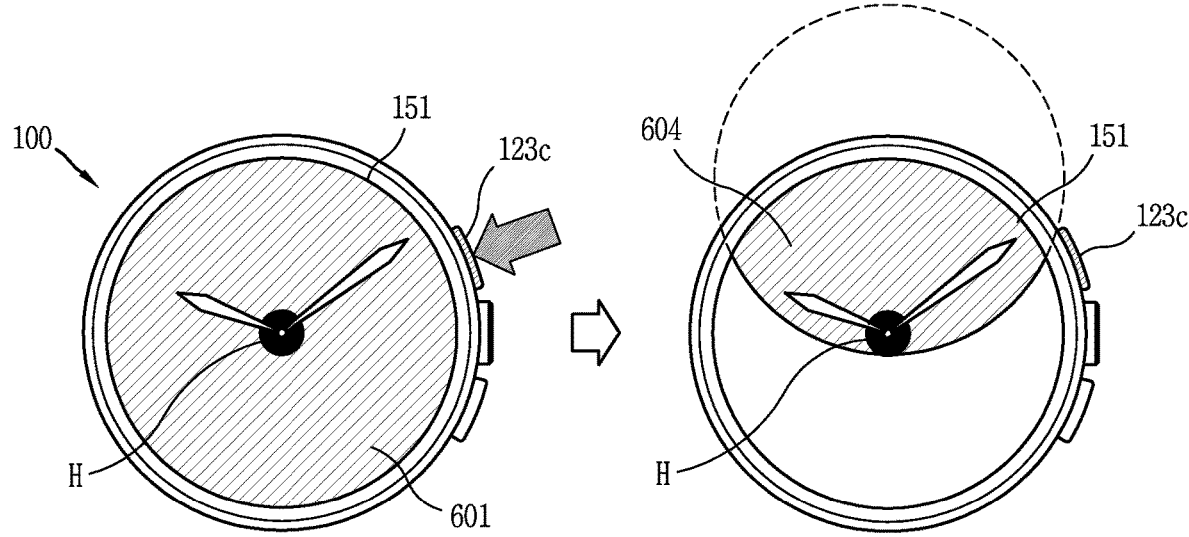

In another example, FIGS. 6A, 6B, and 6C are examples in which screen information displayed is finely shifted to a desired position around the hole region (H) by pulling and rotating the key on the side, and information related thereto is stored. Referring to FIG. 6A, when a push input is applied to the upper key 123c on the side while the screen information 601 is displayed on the touch screen 151, the screen information 601 moves slightly upward around the hole region. Further, when the center key 123b on the side is continuously pulled out (RSB Pull out), the display position of the moved screen information 602 is fixed (b).

Then, when the pulled center key 123b is rotated in a clockwise direction (cw), the display position of the moved screen information 602 moves further upward in correspondence with the rotation direction and the rotation degree of the center key 123b (603) (c). On the contrary, when the pulled center key 123b is rotated in a counterclockwise direction (acw), the display position of the moved screen information 602 moves further downward based the rotation direction and the rotation degree of the center key 123b (604) (d).

Here, even when the input applied to the upper key and the center key 123c,123b on the side is released, the display position of the moved screen information is not restored to its original state. In other words, while the pulled state of the center key 123b continues, the display position of the screen information is maintained in the current state.

Then, as illustrated in FIG. 6B, when the center key 123b in the pulled state is pushed toward the main body and restored to its original position (RSB Put in), the moved screen information is fixed at the last display position (604). Even when the center key 123b is turned, the fixed state of the display position is continuously maintained. Besides, the coordinate information corresponding to the display position of the screen information at the time when the center key 123b is restored to its original position is stored in the memory 170 of the watch type terminal 100. In other words, the x, y, and z coordinate values of the display position are stored. The display position of the adjusted screen information may be restored to its original state by pushing the upper key 123c on the side again.

Next, when the upper key 123c on the side is pushed when the entire screen information is displayed on the touch screen 151 as illustrated in FIG. 6C, the screen information is not shifted by a default value but immediately moved to the previously stored display position (604). Thus, the controller 180 can control the movement of the screen information by loading the coordinate values stored in the memory 170 and applying the same to the current screen information in response to the pushing of the upper key 123c on the side. In other words, the finely set movement value is used as the movement fixed value of the screen information.

In another example, the movement of the screen information by the movement value may not be applied as a fixed value, but may be applied only once or a predetermined number of times, or only when there is an affirmative response through user confirmation.

Figure 7A:
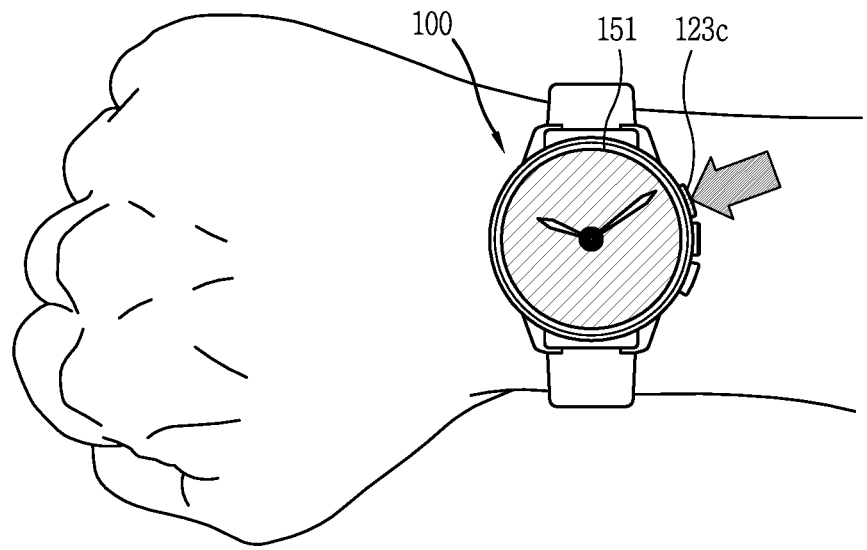
FIGS. 7A and 7B are exemplary views illustrating a key input that is set differently according to a user's wearing position in a watch type terminal according to an embodiment of the present disclosure.
Figure 7B:
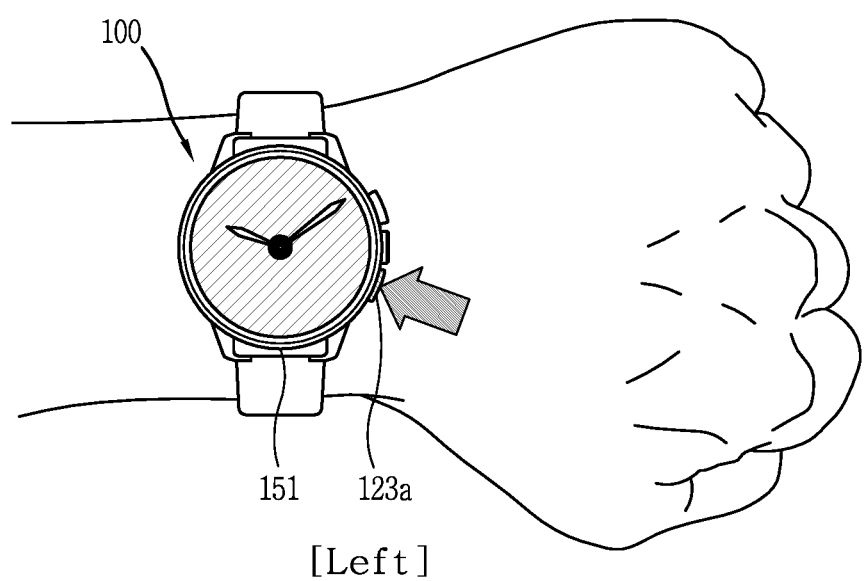

Further, FIGS. 7A and 7B are examples illustrating a key input that is set differently according to a user's wearing wrist position in a watch type terminal according to an embodiment of the present disclosure. FIG. 7A is an example in which the user wears the watch type terminal 100 on the right wrist, and FIG. 7B is an example in which the user wears the watch type terminal 100 on the left wrist.

When the watch type terminal 100 is worn on the right wrist as illustrated in FIG. 7A, the upper key 123c on the side is pushed to set the screen information to move as described above. As illustrated in FIG. 7B, when the watch type terminal 100 is worn on the left wrist, the screen information can be exceptionally set to move even when the lower key 123a on the side is pushed. This is because it is more natural for the lower key 123a to be pushed and operated than the upper key 123c when the user wears the watch type terminal 100 on the left wrist. For this purpose, one of the upper key 123c and the lower key 123a can be selectively set to a key for receiving the above-described control command by recognizing the wearing position through a sensor provided in the watch type terminal 100.

Figure 8:
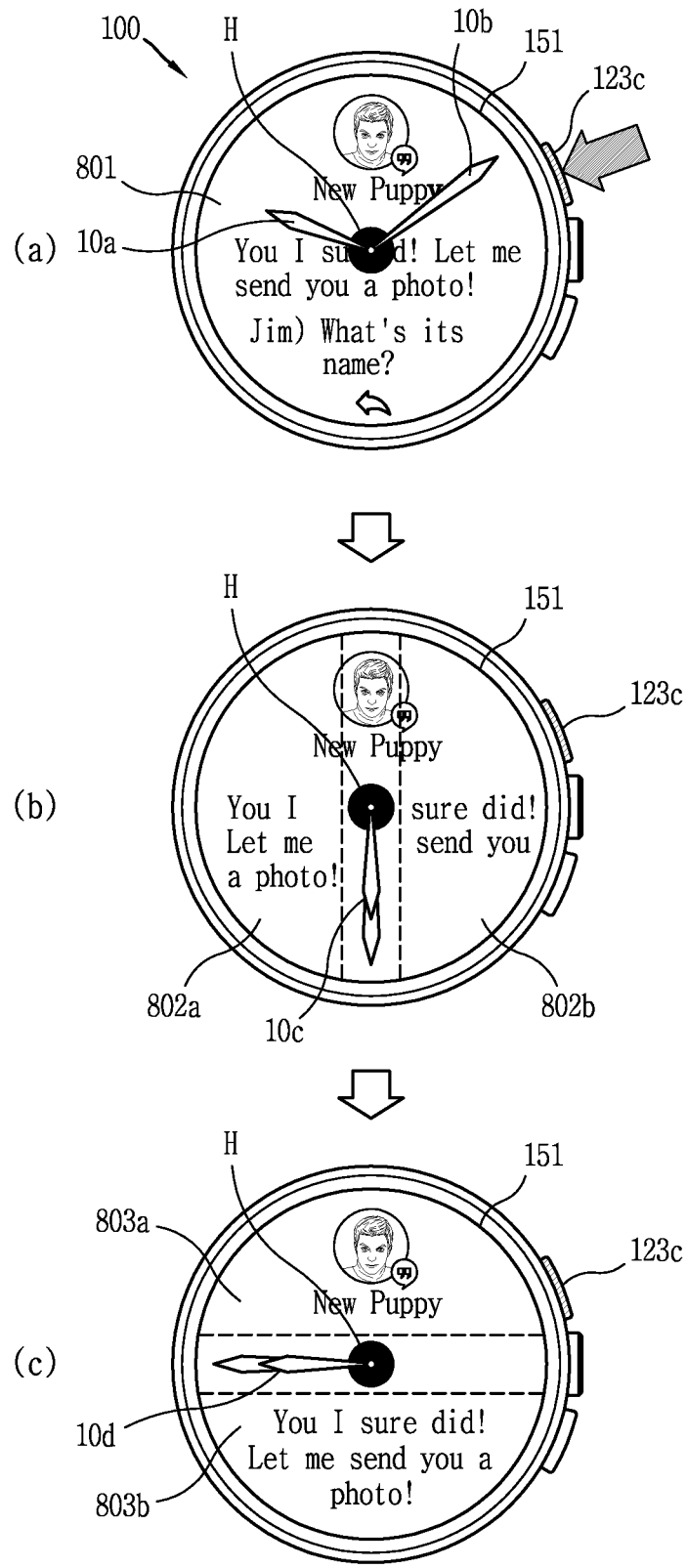
FIGS. 8, 9A, 9B, 9C and 9D are views illustrating various examples for quickly checking information that is covered or at least partially overlapped by a hole region in a watch type terminal according to an embodiment of the present disclosure.

Hereinafter, FIGS. 8, 9A, 9B, 9C, and 9D are views illustrating various examples for quickly checking information that is covered or at least partially overlapped by the hole region without moving the entire screen information. Referring to FIG. 8, when a multimedia screen 801 including text and images is displayed on the touch screen 151, a part of the multimedia screen 801 is covered by the hole region (H). Further, when the upper key 123c on the side of the main body is pushed, the mechanical hands 10a, 10b are aligned at a predetermined position rather than moving the multimedia screen 801.

In FIG. 8, the plurality of mechanical hands 10a, 10b are both aligned at 6 o'clock direction, but the present disclosure is not limited to such a position, and may be varied to various positions, and the hands indicating 'hour' and 'minute' may be aligned in a form spreading in the longitudinal/transverse directions, respectively. When the plurality of mechanical hands 10a, 10b are aligned in the 6 o'clock direction, the multimedia screen 801 can be divided into a first portion 802a and a second portion 802b.

When a push input is applied once again to the upper key 123c on the side, the plurality of mechanical hands 10a, 10b can be aligned at a different position, for example, at the 9 o'clock direction. Accordingly, the multimedia screen, which has been relocated to the first and second portions 802a, 802b, may be divided and displayed into the third portion 803a and the fourth portion 803b based on the 9 o'clock direction. Accordingly, information can be displayed naturally away from the hole region (H) and the mechanical hands 10a, 10b. Furthermore, when a push input is applied successively to the upper key 123c, the multimedia screen may be restored to its original position (801).

In the embodiment described above, when the push input is applied to the side key, the entire display may be rearranged to the remaining region away from the hole region (H) and the clock hand without moving the entire displayed screen, thereby allowing the user to quickly check the information that has been covered by the hole region (H) and the clock hand.

In another example, when the upper key 123c is pushed, only the displayed information is horizontally or vertically divided and arranged around the hole region (H) without aligning the position of the mechanical hands to a predetermined position (i.e., while continuously maintaining the clock function).

Figure 9A:
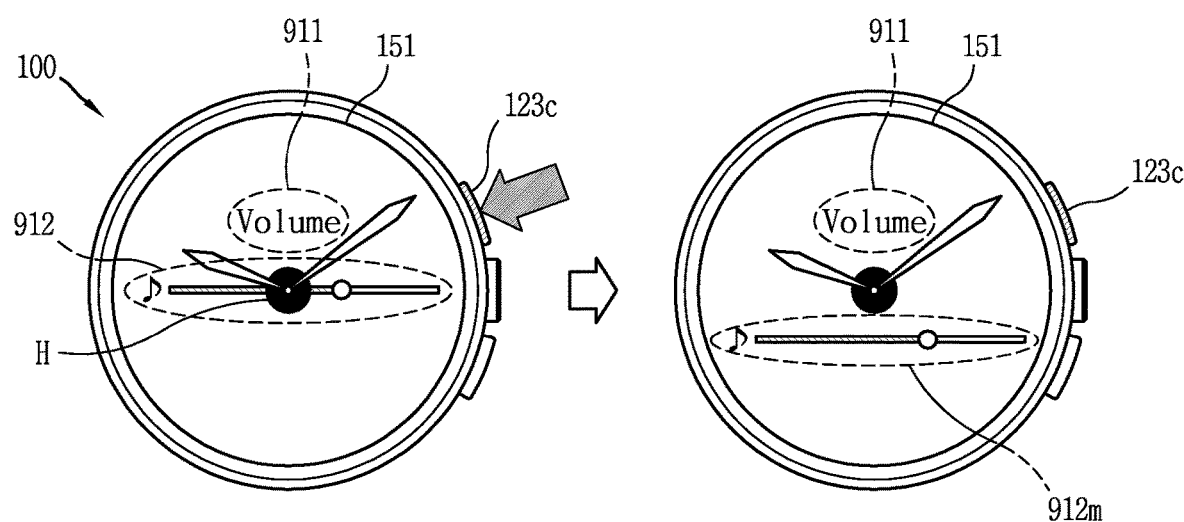
Figure 9B:
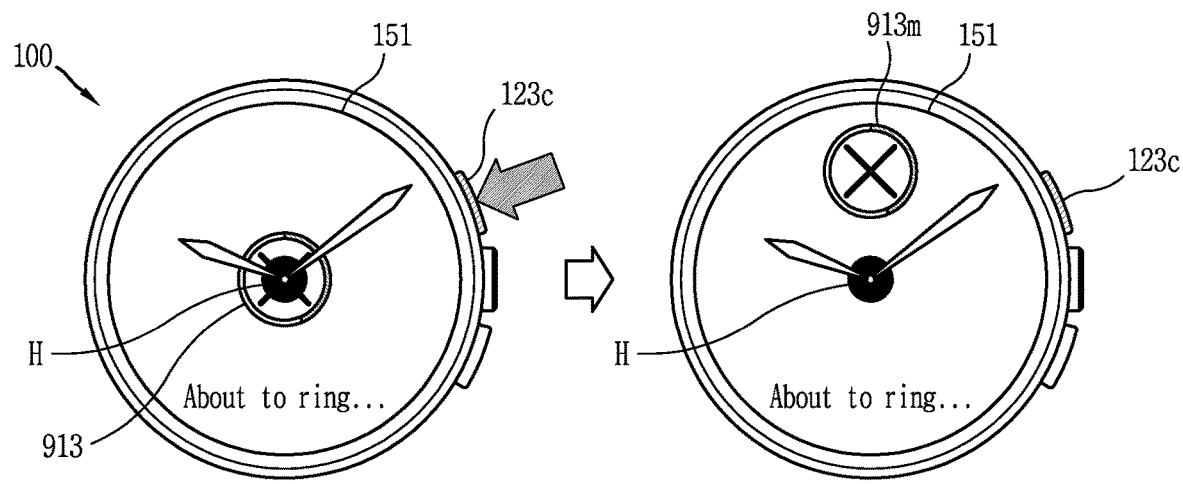
Figure 9C:
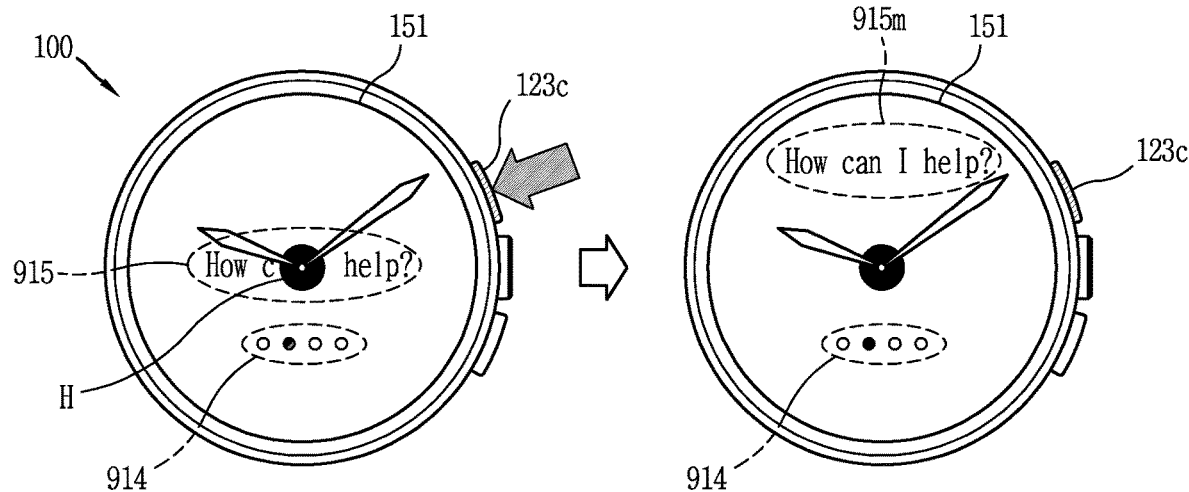

Next, FIGS. 9A through 9C are examples in which at least a part of the displayed screen information covered by the hole region (H) or at least a part of which overlaps with the hole region (H) is detected, and only the detected object is disposed away from the hole region (H). First, FIG. 9A illustrates a graphic object in the form of a control bar 912 passing through the hole region (H) of the touch screen 151 is displayed. In this instance, when a push input is applied to the upper key 123c on the side of the main body, the controller 180 recognizes the control bar 912, which partly overlaps the hole region (H), and determines a position to which the control bar 912 is to be moved based on the display position of objects displayed on the touch screen 151.

For example, the controller 180 can first determine whether the control bar 912 is at a position movable to the upper side of the hole region (H) that provides a visual sense of stability. As a result of the determination, since there is another object ('Volume') 911, the controller 180 determines whether a lower side of the hole region (H) is at a movable position. The controller 180 recognizes that there is no other object according to the judgment, and controls the touch screen 151 to move the position of the control bar 912 to a lower side of the hole region (H). In other words, when other information is encountered when the covered information is rearranged, a flow is operated to search for another position.

Further, a degree of movement of the control bar 912 can be determined by comparing a horizontal length of the control bar 912 with that of the position to be moved. If the control bar 912 is long in the vertical direction, it may be determined by comparing a vertical length of the control bar with that of the position to be moved.

In another example, when a part of an icon 913 overlaps with the hole region (H) as illustrated in FIG. 9B, when the upper key 123c on the side is touched, only the relevant icon 913 is moved upward from the hole region (H). Besides, as illustrated in FIGS. 9A and 9B, when information covered by the hole region (H) is a menu object capable of executing a specific function, a standby time for which an object that has been moved away from the hole region (H) is restored to its original position can be set longer than those for other objects. This is to hold the user's choice.

FIG. 9C illustrates when some text constituting a sentence is covered by the hole region (H). Further, when a push input is applied to the upper key 123c on the side, the entire sentence is controlled to move away from the hole region (H) without moving only the recognized part of the text 'can I' away from the hole region (H).

Figure 9D:
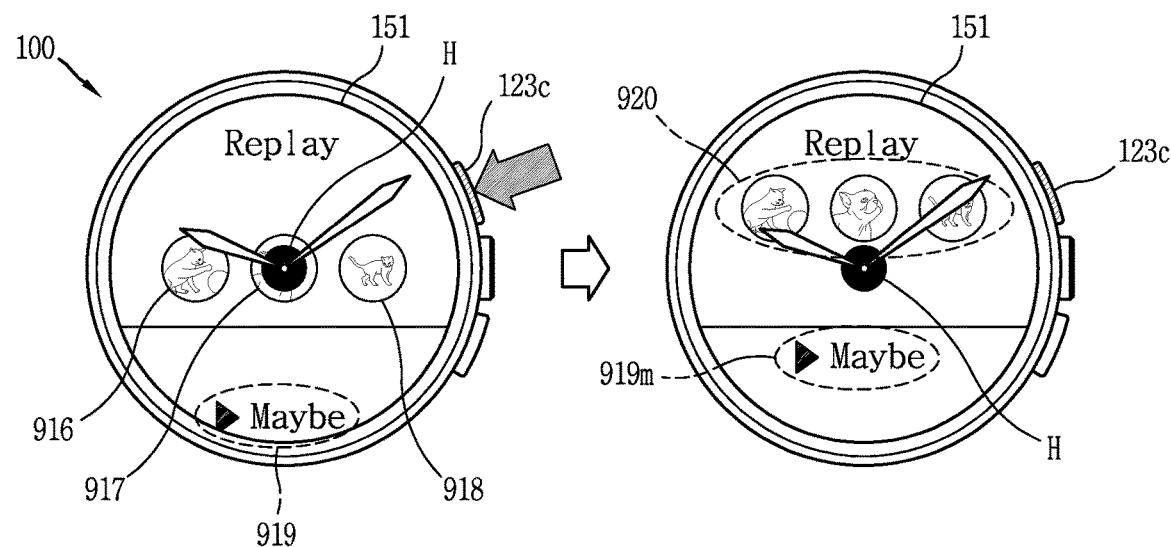

As a similar example, FIG. 9D illustrates when different objects are grouped together and rearranged away from the hole region (H). As illustrated in FIG. 9D, when a push is applied to the upper key 123c on the side of the main body while a multimedia screen having various attributes (e.g., images, videos, text) is displayed on the touch screen 151, the controller 180 groups one or more objects having the same attributes as those covered by the hole region (H). In FIG. 9D, a second icon 916, a third icon 918, and a playback menu 919 having a different arrangement position but having the same attribute are grouped as one group together with the first icon 917 covered by the hole region (H). Then, the grouped objects 916, 917, 918, and 919 are rearranged away from the hole region (H) (920, 919m).

Further, the grouped objects are not necessarily arranged in the same region, but arranged close to the original position with respect to the hole region (H) as illustrated in FIG. 9D. This is because as the positional movement of the objects is reduced, the user's visual inconvenience is decreased. In addition, according to an example, the grouped objects can be down-scaled and displayed by taking the expected position of the grouped objects and the size of the objects into account.

Figure 10:
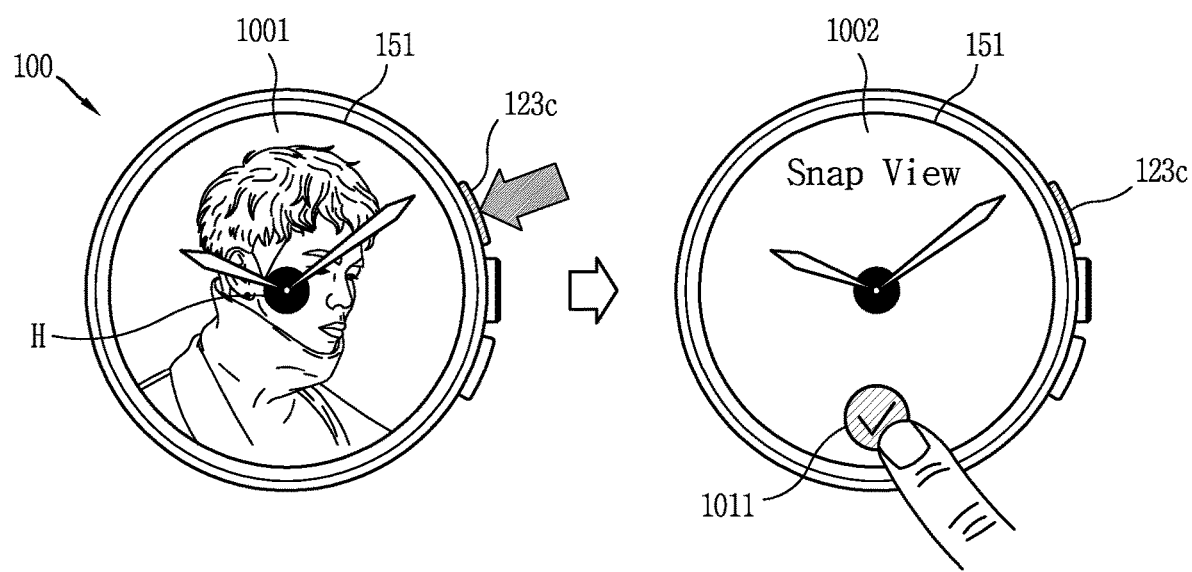
FIG. 10 is an example illustrating feedback on a screen movement guide in a watch type terminal according to an embodiment of the present disclosure.

Further, FIG. 10 is an example of a screen for guiding the execution of screen movement prior to screen movement and simultaneously performing a feedback request. As illustrated in FIG. 10, when a push input is applied to the upper key 123c on the side while the screen information, for example, an image 1001, is displayed on the touch screen 151, an execution screen 1002 for moving the displayed image 1001 in a predetermined direction is displayed.

The controller 180 determines whether to move the displayed image 1001 based on a touch input applied to the execution screen 1002. Thus, an icon 1011 for feedback response or confirmation input can be displayed on the execution screen 1002 away from the hole region (H). Furthermore, at a time point when the touch input is applied to the icon 1011, the displayed image 1001 is moved in a predetermined direction.

A state in which the image 1001 is moved continues until the push input is successively applied to the upper key 123c on the side of the main body. Moreover, a screen for requesting a feedback response or a confirmation input of the user can be displayed similarly to the above, even prior to restoring the movement state of the image 1001.

Figure 11:
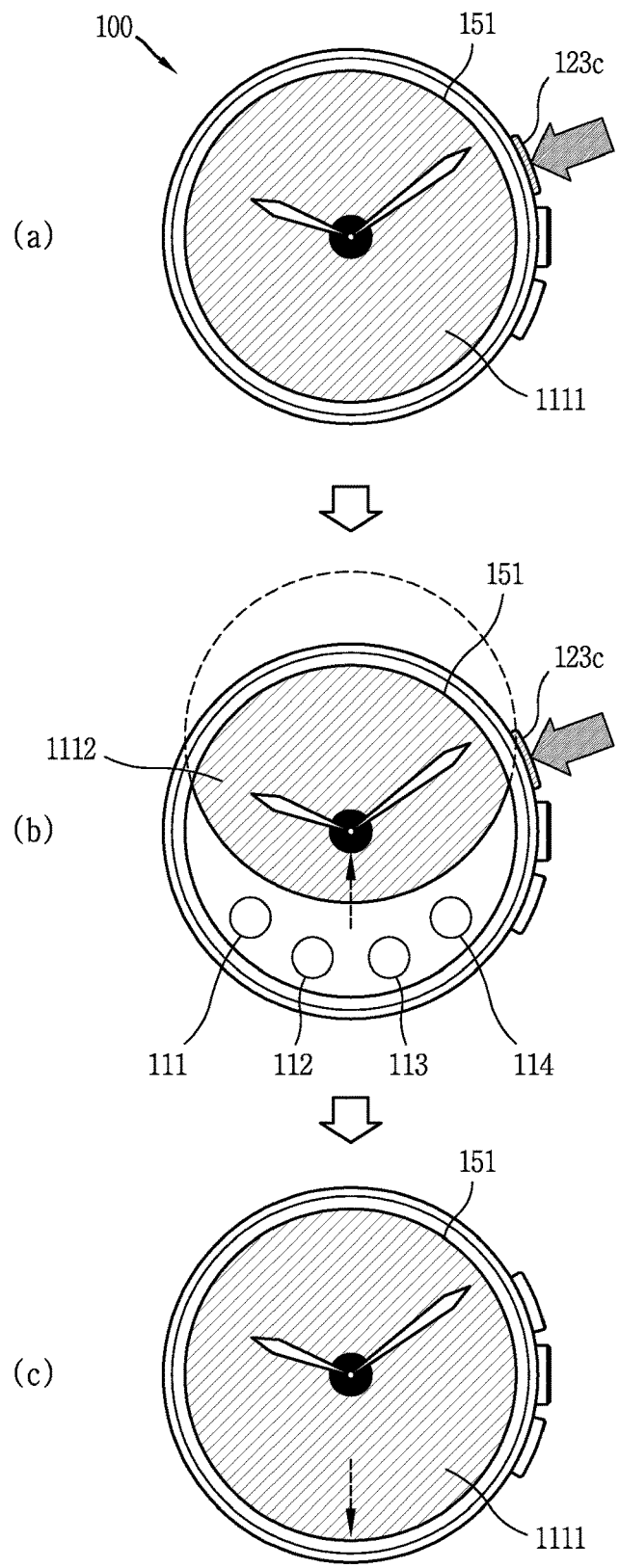
FIGS. 11, 13A and 13B are views illustrating various examples of utilizing a region beyond a displayed edge according to a current movement of a screen in a watch type terminal according to an embodiment of the present disclosure.
Figure 13A:
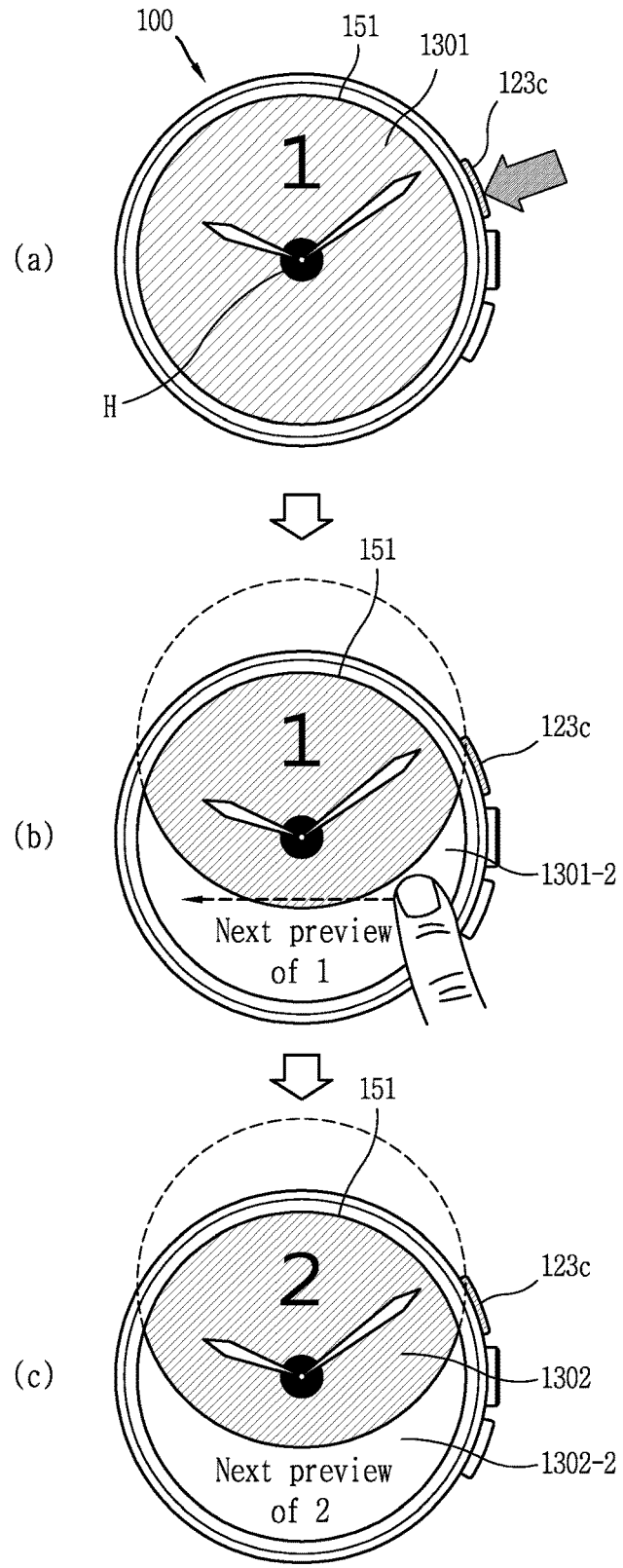
Figure 13B:
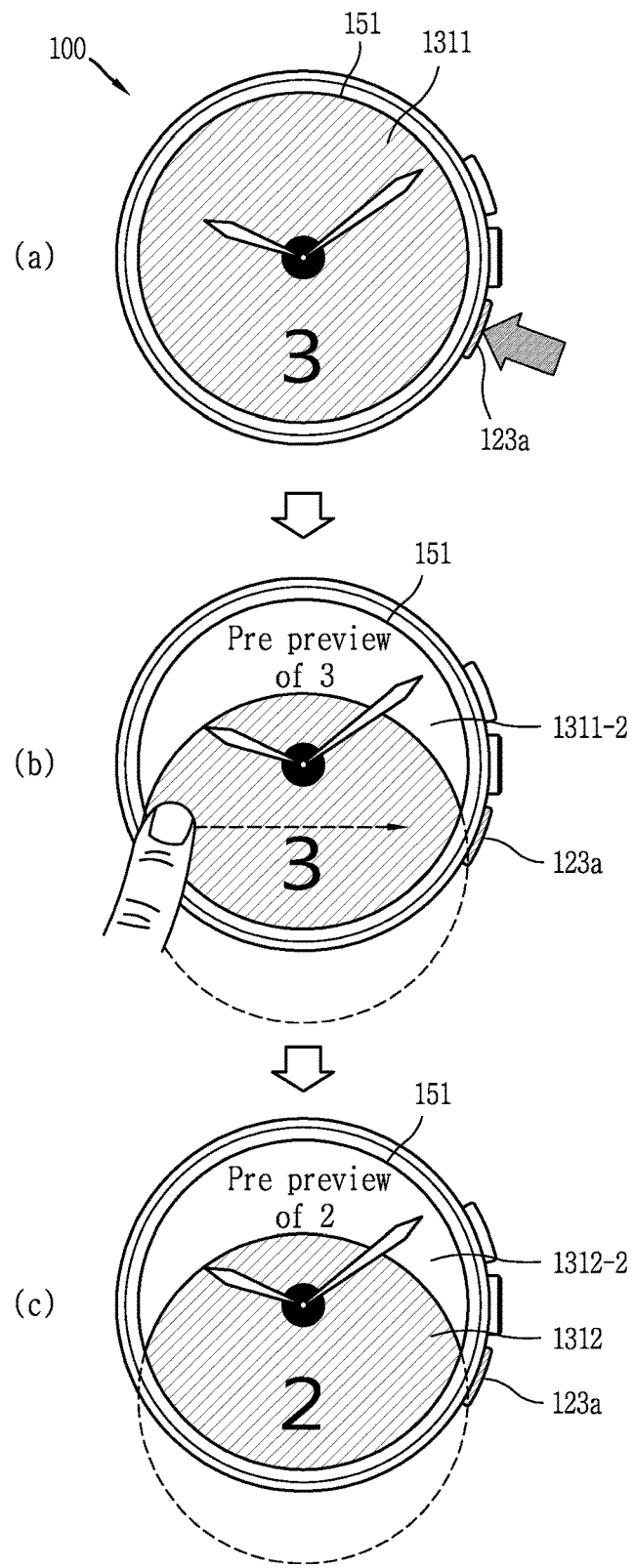

Next, FIGS. 11, 13A, and 13B specifically illustrate various examples of utilizing a region beyond an edge of the screen displayed on the touch screen according to the movement of the screen in the watch type terminal. Referring to FIG. 11, when a push input is applied to the upper key 123c on the side of the main body while the screen information 1111 is displayed on the touch screen 151 (a), a region beyond the edge of the screen information 1111 is exposed while the entire screen information 1111 is moved in a predetermined direction, for example, in an upward direction around the hole region (H).

Further, a plurality of objects 111, 112, 113, 114 can be displayed in a region beyond the edge of the screen information 1111 (b). Here, the objects may be function icons for executing specific functions or icons of applications. Besides, the size and number of objects may vary depending on a degree to which the screen information is moved. For example, the number of objects displayed by a difference in which the screen information 1111 is shifted away from the hole region may also increase proportionally.

In addition, the objects may be menus associated with the attributes of the shifted screen information 1112. They may include contact information. For example, when the shifted screen information 1112 includes a face of a specific person, the controller 180 recognizes the face of the specific person to display a function icon corresponding to communicable contact information having the specific person as a recipient, for example, a call, an e-mail, a message, an SNS messenger in the relevant region.

The plurality of objects 111, 112, 113, 114 displayed in a region beyond the edge of the screen information 1111 automatically disappear in accordance with the positional restoration of the screen when a predetermined period of time elapses or a push input successive to the upper key 123c on the side is applied thereto (1111) (c).

For another embodiment, as illustrated in FIGS. 13A and 13B, a preview or a part of the previous/next screen information (hereinafter, referred to as 'second screen information') of the moved screen information can be displayed in the regions 1301-2, 1302-2, 1311-2, 1312-2 beyond the edges of the screen information exposed in accordance with the movement of the screen information.

First, referring to FIG. 13A, when a push is applied to the upper key 123c on the side of the main body when an execution screen 1301 of a first application is displayed on the touch screen 151 of the watch type terminal, a preview or a part of a next execution screen or a single-depth-decreased execution screen or a last execution screen of the first application is displayed in the region 1301-2 beyond the edge while the execution screen 1301 of the first application is moved upward around the hole region (H).

When a swipe input is applied to the touch screen 151, an execution screen 1302 of another application being executed, namely, a second application, is displayed in a shifted state along the swipe direction without being skipped to the next/previous execution screen of the first application. Then, a preview or a part of a next execution screen or a single-depth-decreased execution screen or a last execution screen of the second application is displayed in the region 1302-2 beyond the edge of the execution screen 1302 of the second application shifted upward.

In another example, referring to FIG. 13B, when a push is applied to the lower key 123a on the side of the main body at this time when an execution screen 1311 of a third application is displayed on the touch screen 151 of the watch type terminal, a preview or a part of a previous execution screen or a single-depth-increased execution screen or an initial execution screen of the third application is displayed in the region 1311-2 beyond the edge while the execution screen 1311 of the third application is moved downward around the hole region (H) (e.g., moved in correspondence with the position of the pushed key).

When a swipe input is applied to the touch screen 151, an execution screen 1302 of another application being executed, namely, a second application, is displayed in a shifted state along the swipe direction without being skipped to the next/previous execution screen of the third application (1312). Then, a preview or a part of a previous execution screen or a single-depth-increased execution screen or a last execution screen of the second application is displayed in the region 1312-2 beyond the edge of the execution screen 1312 of the second application shifted downward.

Figure 14:
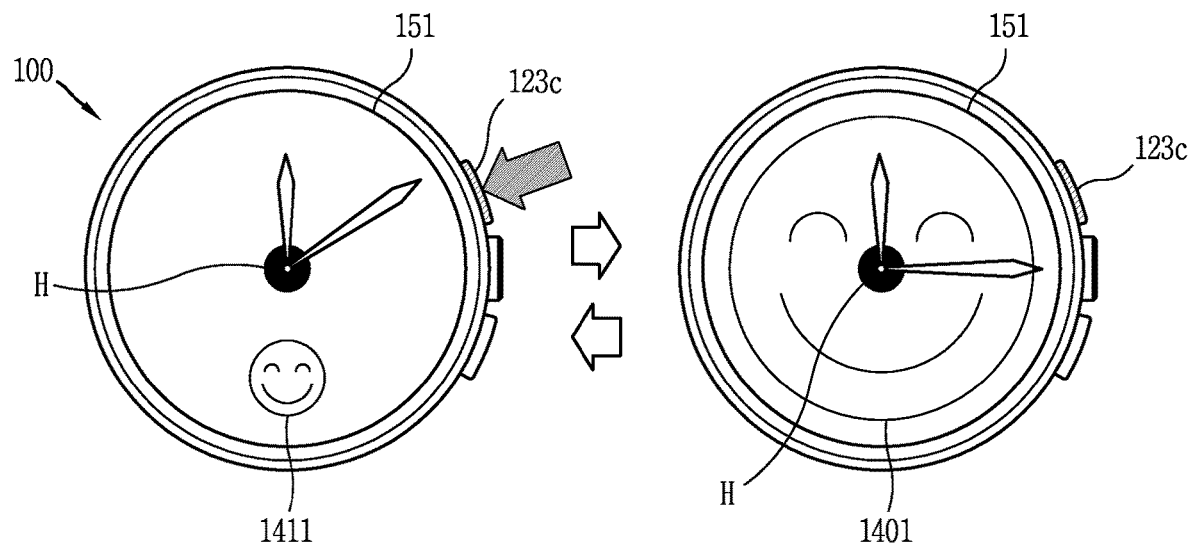
FIG. 14 is an exemplary view of a method of scaling a menu based on a hole region in a watch type terminal according to an embodiment of the present disclosure.

As described above, according to the present disclosure, a region can be used in various ways beyond a displayed edge for a visual effect in accordance with the movement of the screen to avoid the hole region (H), thereby enhancing the use convenience of a user and the utility of a function. Further, as an example of utilizing the hole region (H), FIG. 12 illustrates an example of relocating the screen with respect to the hole region, and FIG. 14 illustrates an example of scaling an image with respect to the hole region.

Figure 12:
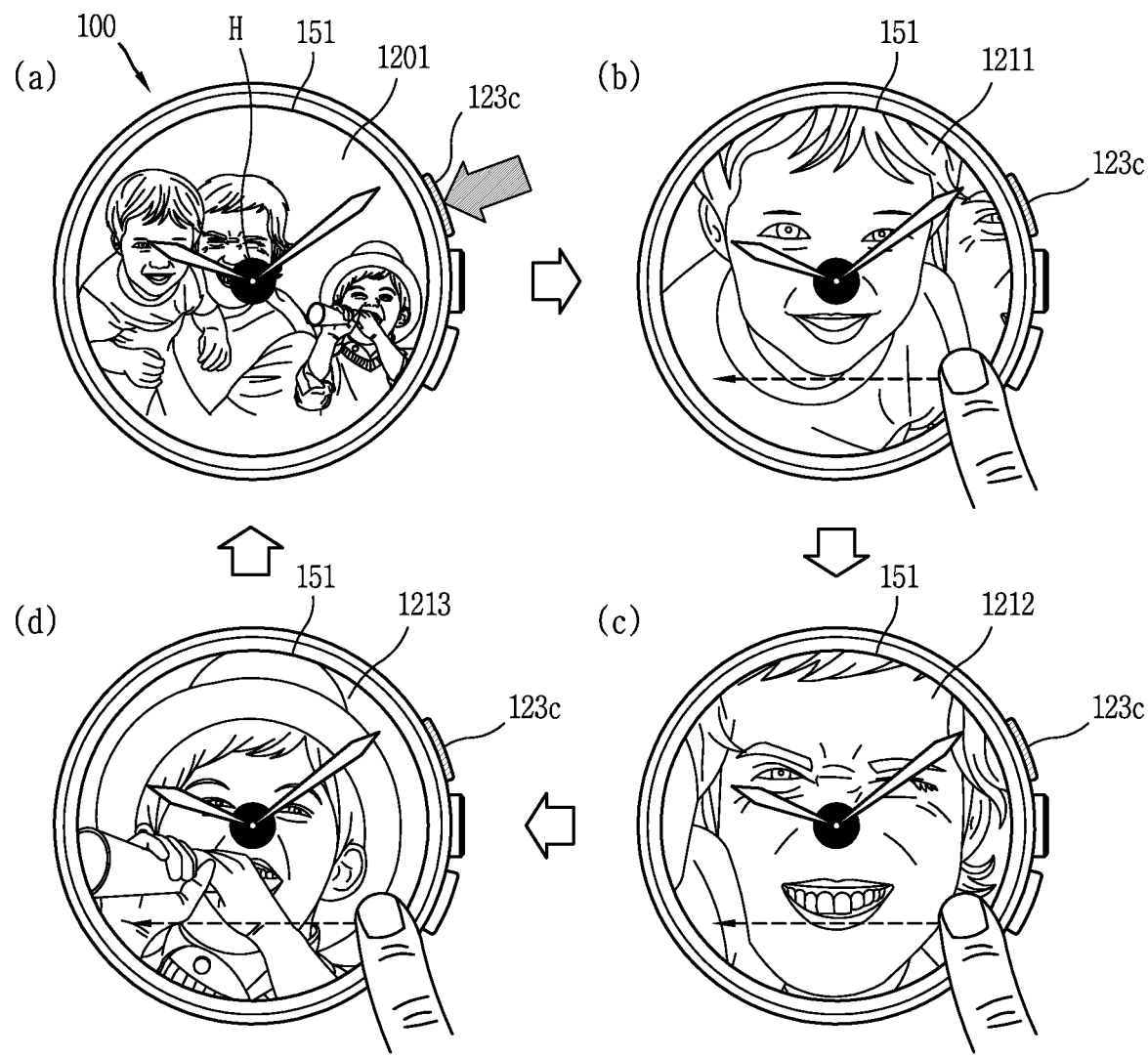
FIG. 12 is an example of a method of rearranging a screen based on a hole region.

First, referring to FIG. 12, an image 1201 including a plurality of faces can be displayed on the touch screen 151 of the watch type terminal 100 (or a terminal paired with the watch type terminal 100). Further, some of the plurality of faces may be covered by the hole region (H). In such a case, the screen movement method as described above may not be suitable for viewing a picture.

Accordingly, according to the present embodiment, when the upper key 123c of the side of the main body is pushed while the image 1201 including a plurality of faces or an image including a single face is displayed, the controller 180 recognizes a face region (or face regions) included in the image 1201. Then, the controller 180 then rearranges or up/down-scales the position of the image 1201 or face such that a specific portion of the recognized face region, for example, a nose portion, is in the hole region (H) of the touch screen 151 (b). As illustrated in FIG. 12A, when a plurality of faces are included in the image 1201, one face is rearranged around the hole region (H), and then the next faces 1212,1213 are sequentially displayed according to a swipe input or the lapse of time (b) (c).

Further, when the watch type terminal 100 is paired with another terminal (e.g., a smart phone), a face and a photo recognized by the another terminal in communication may be also shared with the watch type terminal 100. In this instance, a plurality of face photos can be rearranged around the hole region (H) in accordance with a circular screen structure of the watch type terminal 100 and sequentially displayed one by one.

In another example, referring to FIG. 14, when a push is applied to the upper key 123c on the side of the main body when an emoji or a circular icon 1411 is displayed in a region other than the hole region of the touch screen 151 or in the vicinity of the hole region, the controller 180 controls the touch screen 151 such that a menu object such as an emoji or circular icon included in the displayed screen information is upscaled around the hole region for a reference period of time (1401) and then restored.

Even Further, as described above, the center of the upscaled emoji or circular icon is arranged to be in the hole region, thereby providing the fun of providing a nose end at the center thereof. Further, while the icon or circle icon is upscaled, additional information in the image, such as contact information of the sender who sent an emoji, can be displayed.

According to such an example, when a portrait, an emoji, or a circular icon is displayed in accordance with the circular screen of the watch type terminal 100, the screen is arranged such that the center position of the nose end or the emoji or icon is located in the hole region, thereby providing a sense of decoration like a mustache for mechanical hands as well as providing a fun effect of clock embellishment using a character.

Figure 15:
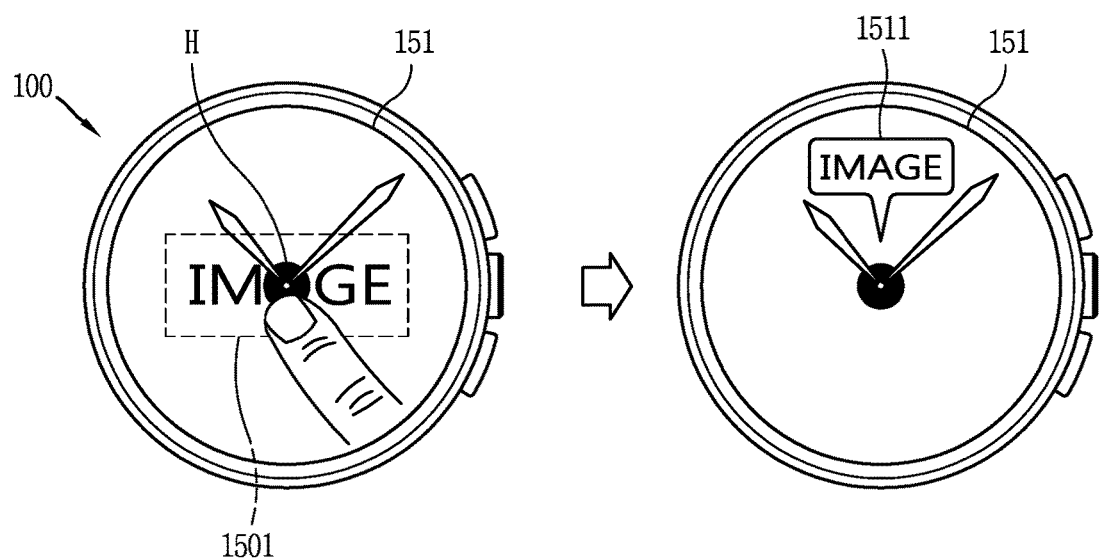
FIG. 15 is an exemplary view illustrating a method of quickly checking information related to a covered object using a touch input to a hole region in a watch type terminal according to an embodiment of the present disclosure.

For still another example, a touch input can be directly applied to the hole region (H) other than the side keys of the main body as illustrated in FIG. 15 to quickly check information related to the covered object. In FIG. 15, when a touch is applied to the hole region (H) in a state where a part of an object 1501 displayed is covered by or overlapped with the hole region (H) of the touch screen 151, information related to an object displayed in the hole region is popped away from the hole region. The popped-up information 1511 may be an object itself including a portion covered by the hole region (H) or may be additional information related to the processing of the object 1501.

As described above, according to the watch type terminal according to an embodiment of the present disclosure, even when a hall region is physically present at the center of the screen due to the application of a mechanical analog clock, screen movement can be performed only by a simple operation for pushing the side key, thereby quickly checking the information covered by the hole region. In addition, the information covered by the hole region and the physical mechanical hands can be quickly rearranged with a single input, thereby quickly securing the visibility of the information displayed on the screen while maintaining the value and sensibility as an analog clock. Besides, through various embodiments that utilize a region beyond the edge of the screen exposed due to the movement of the screen, it is possible to enhance the use of a small screen and utilization of a function. Moreover, a touch input using the hole region at the center of the screen and an image rearrangement around the hole region provides the user with intuitive control and a clock decorating effect.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A watch type terminal, comprising:
   a main body;
   an analog watch portion including a plurality of mechanical hands coupled to the main body to indicate the time;
   a touch screen including a hole region disposed adjacent to the analog watch portion and through which a central shaft supporting a rotation of the plurality of mechanical hands is passed;
   a user input unit disposed on a side surface of the main body and including a plurality of keys; and
   a controller configured to:
   display a first screen on the touch screen in which a part of the first screen is obstructed by the hole region, and
   in response to a predetermined input applied to one of the plurality of keys, move the obstructed part of the first screen away from the hole region and display a region beyond an edge of the first screen.

2. The watch type terminal of claim 1, wherein a degree of movement of the first screen is based on at least one of a size of the hole region and a size of an object in the first screen obstructed by the hole region.

3. The watch type terminal of claim 1, wherein the controller is further configured to restore the display of the first screen in which the part of the first screen is obstructed by the hole region after a preset period of time elapses.

4. The watch type terminal of claim 3, wherein the controller is further configured to restore the display of the first screen when a predetermined input is applied to one of the plurality of keys prior to the preset period of time.

5. The watch type terminal of claim 1, wherein the controller is further configured to adjust the movement of the first screen and a display degree of the region beyond the edge of the first screen based on a drag and touch input applied to the touch screen while the predetermined input is applied to one of the plurality of keys.

6. The watch type terminal of claim 1, further comprising:
   a sensor configured to sense a movement according to a wearing of the main body,
   wherein the controller is further configured to adjust a movement direction and a movement degree of the first screen based on a movement sensed by the sensor while the predetermined input is applied to one of the plurality of keys, and restore a display position of the first screen when the predetermined input is released.

7. The watch type terminal of claim 1, wherein the controller is further configured to adjust a movement direction and a movement degree of the first screen information based on a rotation direction and a rotation degree of another key pulled out among the plurality of keys.

8. The watch type terminal of claim 7, wherein the controller is further configured to display the first screen to be fixed to an adjusted display position in response to the another key being restored to its original state.

9. The watch type terminal of claim 8, wherein the controller is further configured to store coordinate information corresponding to the display position of the first screen at a time point when the another key is restored to its original state, and move a second screen based on a display position corresponding to the stored coordinate information when the predetermined input is applied to one of the plurality of keys.

10. The watch type terminal of claim 1, wherein the plurality of mechanical hands are aligned at a predetermined position of the touch screen, and
    wherein the first screen information is divided into a first portion and a second portion displayed away from the hole region and the plurality of mechanical hands.

11. The watch type terminal of claim 1, wherein the controller is further configured to:
    detect an object in the first screen that is covered by or at least partially overlapped with the hole region when the predetermined input is applied to one of the plurality of keys, and
    only move the detected object in the first screen away from the hole region.

12. The watch type terminal of claim 11, wherein the controller is further configured to group other objects having the same attributes as the detected object, and rearrange the grouped objects away from the hole region.

13. The watch type terminal of claim 1, wherein the controller is further configured to:
    display an execution screen for moving the first screen in a predetermined direction on the touch screen, and
    move the first screen based on a touch input applied to the execution screen when the predetermined input is applied to one of the plurality of keys.

14. The watch type terminal of claim 1, wherein the controller is further configured to:
    display a function icon associated with the first screen in the region beyond the edge of the first screen, and
    stop displaying the function icon when the first screen is restored to its original position according to a lapse of a predetermined period of time.

15. The watch type terminal of claim 1, wherein the controller is further configured to:
    recognize a face region included in the first screen, and rearrange the first screen such that a specific portion of the recognized face region is in the hole region when the predetermined input is applied to one of the plurality of keys.

16. The watch type terminal of claim 1, wherein the controller is further configured to display a menu object included in the first screen to be upscaled around a hall region for a reference period of time when the predetermined input is applied to one of the plurality of keys.

17. The watch type terminal of claim 1, wherein the controller is further configured to display information related to an object displayed in the hole region among the first screen away from the hole region when a touch is applied to the hole region while the first screen information is displayed.

18. The watch type terminal of claim 1, wherein the obstructed part of the first screen corresponds to a part of the first screen covered or partially overlapped by the hole region.

19. The watch type terminal of claim 1, wherein the controller is further configured to move the obstructed part of the first screen entirely away from the hole region.

* * * * *